United States Patent
Eckel

(10) Patent No.: US 12,443,354 B2
(45) Date of Patent: Oct. 14, 2025

(54) BOOT AND INITIALIZATION TECHNIQUES FOR STACKED MEMORY ARCHITECTURES

(71) Applicant: Micron Technology, Inc., Boise, ID (US)

(72) Inventor: Nathan A. Eckel, Lufkin, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/671,485

(22) Filed: May 22, 2024

(65) Prior Publication Data

US 2024/0402925 A1    Dec. 5, 2024
US 2025/0278206 A2    Sep. 4, 2025

Related U.S. Application Data

(60) Provisional application No. 63/470,683, filed on Jun. 2, 2023.

(51) Int. Cl.
    *G06F 3/06*    (2006.01)

(52) U.S. Cl.
    CPC .......... *G06F 3/0632* (2013.01); *G06F 3/0619* (2013.01); *G06F 3/0679* (2013.01)

(58) Field of Classification Search
    CPC .... G06F 3/0632; G06F 3/0619; G06F 3/0679; G11C 7/20; G11C 16/20
    See application file for complete search history.

(56) References Cited

U.S. PATENT DOCUMENTS

| | | | | |
|---|---|---|---|---|
| 9,274,544 B2 * | 3/2016 | Kulick | ...................... | G06F 1/12 |
| 2010/0180061 A1 * | 7/2010 | Toshimitsu | ........... | G06F 13/385 |
| | | | | 710/305 |
| 2022/0165321 A1 * | 5/2022 | Seo | ...................... | G11C 7/1066 |
| 2024/0402925 A1 * | 12/2024 | Eckel | .................... | G06F 3/0619 |
| 2025/0094331 A1 * | 3/2025 | He | ...................... | G06F 12/0246 |

\* cited by examiner

*Primary Examiner* — Hiep T Nguyen
(74) *Attorney, Agent, or Firm* — Holland & Hart LLP

(57) ABSTRACT

Methods, systems, and devices for boot and initialization techniques for stacked memory architectures are described. A memory system may include a common logic block operable to output an indication to each of a set of multiple interface blocks to initiate an initialization program, an evaluation program, or both, where the interface blocks may each be operable to access memory arrays via a respective set of one or more channels. The common logic block may receive a command to initialize or evaluate operations associated with the interface blocks or the respective memory arrays. The common logic block may output an indication of a set of instructions associated with the initialization or evaluation. The interface blocks may, using the received indication, obtain the instructions and perform one or more operations associated with the instructions. In some examples, the common logic block may output the indication in response to identifying a power-on condition.

20 Claims, 9 Drawing Sheets

BOOT AND INITIALIZATION TECHNIQUES FOR STACKED MEMORY ARCHITECTURES

CROSS REFERENCE

The present Application for Patent claims priority to U.S. Patent Application No. 63/470,683 by Eckel, entitled "BOOT AND INITIALIZATION TECHNIQUES FOR STACKED MEMORY ARCHITECTURES," filed Jun. 2, 2023, which is assigned to the assignee hereof, and which is expressly incorporated by reference in its entirety herein.

TECHNICAL FIELD

The following relates to one or more systems for memory, including boot and initialization techniques for stacked memory architectures.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells in a non-volatile configuration may maintain stored logic states for extended periods of time even in the absence of an external power source. Memory cells in a volatile configuration may lose stored states when disconnected from an external power source.

DETAILED DESCRIPTION

Figure 1:
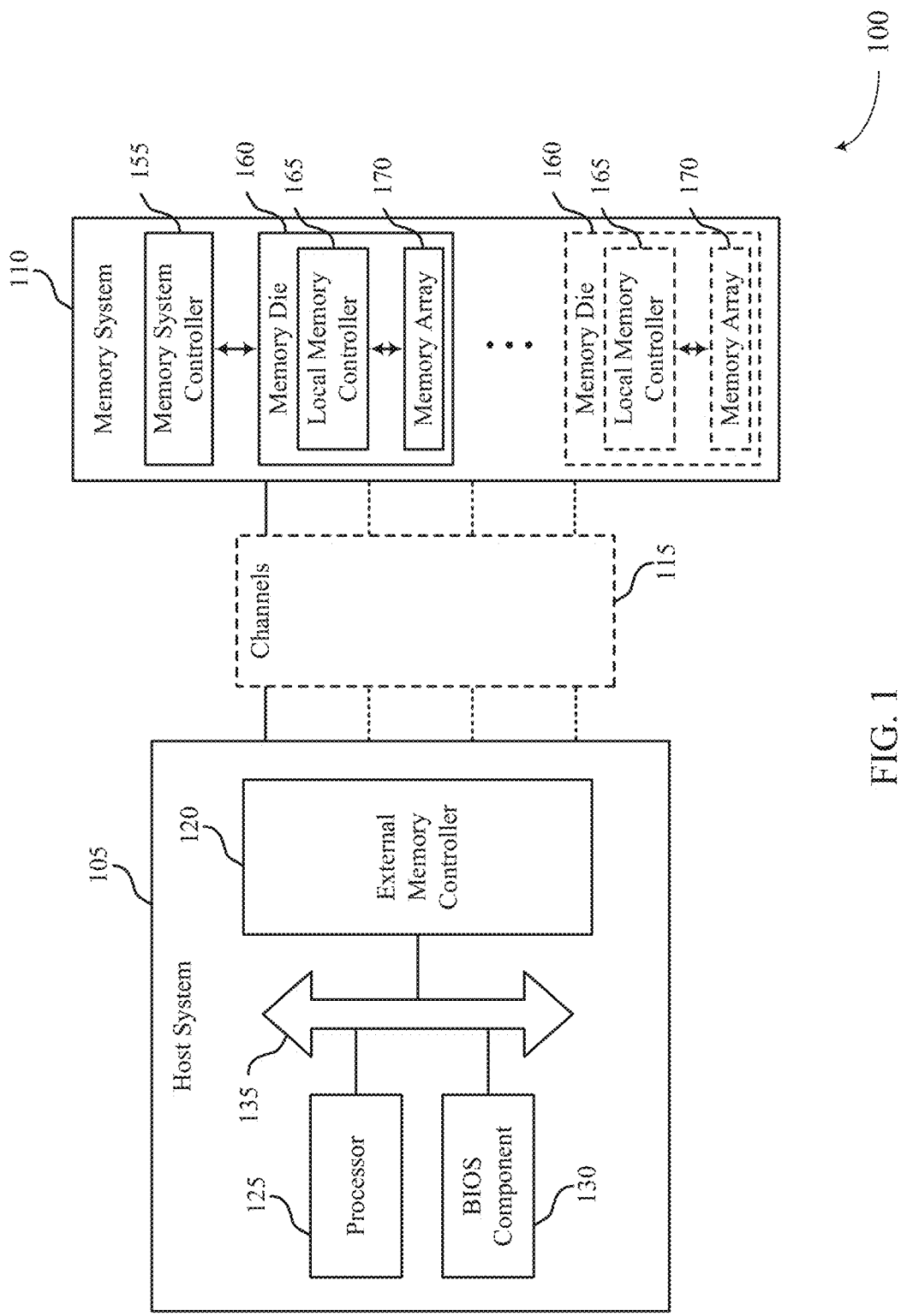
FIG. 1 shows an example of a system that supports boot and initialization techniques for stacked memory architectures in accordance with examples as disclosed herein.

Some memory systems may include a stack of semiconductor dies, including one or more memory dies above a logic die operable to access a set of memory arrays distributed across the one or more memory dies. The logic die may include one or more interface blocks (e.g., memory interface blocks (MIBs), interface circuitry), which may each be operable to access a respective subset of the set of memory arrays (e.g., via a respective set of one or more channels). Such an architecture may be implemented as part of a coupled dynamic random access memory (DRAM) system, and may support solutions for memory-centric logic, such as graphics processing units (GPUs), among other implementations. In some examples, a 3D stacked memory system may be closely coupled (e.g., physically coupled, electrically coupled) with a processor, such as a GPU or other host, as part of a physical memory map accessible to the processor. Such coupling may include one or more processors being implemented in a same semiconductor die as at least a portion of a 3D stacked memory system (e.g., a same die as the one or more interface blocks, as part of a logic die), or a processor being implemented in a die that is directly coupled (e.g., fused) with another die that includes at least a portion of a 3D stacked memory system. Unlike cache-based memory, 3D stacked memory may not be backed by a level of external memory with the same physical addresses. For example, a 3D stacked memory may be associated with and located within a dedicated base address, where each portion of the 3D stacked memory may be non-overlapping within the address.

In accordance with examples as disclosed herein, a memory system (e.g., a 3D stacked memory system) may include a common logic block (e.g., logic circuitry) that is operable to output an indication to each of a set of multiple interface blocks to execute an initialization program, an evaluation program, or both. For example, the common logic block may receive a command (e.g., from a host system, from an external device) to initialize or evaluate operations associated with one or more memory arrays of the memory system. The common logic block may output an indication of a set of instructions (e.g., one or more programs) associated with the initialization or evaluation. The interface blocks may, using the received indication, obtain the instructions (e.g., from a non-volatile storage of the memory system) and perform (e.g., initiate) one or more operations associated with the obtained instructions. In some examples, the common logic block may output the indication in response to identifying a power-on condition (e.g., as part of a boot protocol). In some cases, the one or more operations may include evaluations of interface blocks, memory arrays, or both for proper operations, for establishing trim settings (e.g., for accessing memory cells of the memory arrays), for determining whether to repair components of the memory system (e.g., row repair, column repair, through-silicon via (TSV) repair), or any combination thereof. Such techniques may support efficient initialization and evaluation of the memory system (e.g., of the interface blocks), which may improve performance of the memory system or a system that includes the memory system (e.g., in combination with a host system).

Features of the disclosure are initially described in the context of systems, dies and process flows with reference to FIGS. 1 through 5. These and other features of the disclosure are further illustrated by and described in the context of an apparatus diagram and flowcharts with reference to FIGS. 6 through 9.

FIG. 1 illustrates an example of a system 100 that supports boot and initialization techniques for stacked memory architectures in accordance with examples as disclosed herein. The system 100 may include portions of an electronic device, such as a computing device, a mobile computing device, a wireless communications device, a graphics processing device, a vehicle, or other systems. The system 100 includes a host system 105, a memory system 110, and one or more channels 115 coupling the host system 105 with the memory system 110 (e.g., to provide a communicative coupling). The system 100 may include one or more memory systems 110, but aspects of the one or more memory systems 110 may be described in the context of a single memory system 110.

The host system 105 may be an example of a processor (e.g., circuitry, processing circuitry, a processing component) that uses memory to execute processes, such as a processing system of a computing device, a mobile computing device, a wireless communications device, a graphics processing device, a wearable device, an internet-connected device, a vehicle controller, a system on a chip (SoC), or other stationary or portable electronic device, among other examples. The host system 105 may include one or more of an external memory controller 120, a processor 125, a basic input/output system (BIOS) component 130, or other components (e.g., a peripheral component, an input/output controller, not shown). The components of the host system 105 may be coupled with one another using a bus 135.

An external memory controller 120 may be configured to enable communication of information (e.g., data, commands, control information, configuration information) between components of the system 100 (e.g., between components of the host system 105, such as the processor 125, and the memory system 110). An external memory controller 120 may process (e.g., convert, translate) communications exchanged between the host system 105 and the memory system 110. In some examples, an external memory controller 120, or other component of the system 100, or associated functions described herein, may be implemented by or be part of the processor 125. For example, an external memory controller 120 may be hardware, firmware, or software (e.g., instructions), or some combination thereof implemented by a processor 125 or other component of the system 100 or the host system 105. Although an external memory controller 120 is illustrated outside the memory system 110, in some examples, an external memory controller 120, or its functions described herein, may be implemented by one or more components of a memory system 110 (e.g., a memory system controller 155, a local memory controller 165) or vice versa. In various examples, the host system 105 or an external memory controller 120 may be referred to as a host.

A processor 125 may be operable to provide functionality (e.g., control functionality) for the system 100 or the host system 105. A processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or any combination thereof. In some examples, a processor 125 may be an example of a central processing unit (CPU), a graphics processing unit (GPU), a general-purpose GPU (GPGPU), or an SoC, among other examples.

In some examples, the system 100 or the host system 105 may include an input component, an output component, or a combination thereof. Input components may include a sensor, a microphone, a keyboard, another processor (e.g., on a printed circuit board), an interface (e.g., a user interface, an interface between other devices), or a peripheral that interfaces with system 100 via one or more peripheral components, among other examples. Output components may include a display, audio speakers, a printing device, another processor on a printed circuit board, or a peripheral that interfaces with the system 100 via one or more peripheral components, among other examples.

The memory system 110 may be a component of the system 100 that is operable to provide physical memory locations (e.g., addresses) that may be used or referenced by the system 100. The memory system 110 may include a memory system controller 155 and one or more memory dies 160 (e.g., memory chips) to support a capacity for data storage. The memory system 110 may be configurable to work with one or more different types of host systems 105, and may respond to and execute commands provided by the host system 105 (e.g., via an external memory controller 120). For example, the memory system 110 (e.g., a memory system controller 155) may receive a write command indicating that the memory system 110 is to store data received from the host system 105, or receive a read command indicating that the memory system 110 is to provide data stored in a memory die 160 to the host system 105, or receive a refresh command indicating that the memory system 110 is to refresh data stored in a memory die 160, among other types of commands and operations.

A memory system controller 155 may include components (e.g., circuitry, logic) operable to control operations of the memory system 110. A memory system controller 155 may include hardware, firmware, or instructions that enable the memory system 110 to perform various operations, and may be operable to receive, transmit, or execute commands, data, or control information related to operations of the memory system 110. A memory system controller 155 may be operable to communicate with one or more of an external memory controller 120, one or more memory dies 160, or a processor 125. In some examples, a memory system controller 155 may control operations of the memory system 110 in cooperation with a local memory controller 165 of a memory die 160.

Each memory die 160 may include a local memory controller 165 and a memory array 170. A memory array 170 may be a collection of memory cells, with each memory cell being operable to store one or more bits of data. A memory die 160 may include a two-dimensional (2D) array of memory cells, or a three-dimensional (3D) array of memory cells. In some examples, a 2D memory die 160 may include a single memory array 170. In some examples, a 3D memory die 160 may include two or more memory arrays 170, which may be stacked or positioned beside one another (e.g., relative to a substrate).

A local memory controller 165 may include components (e.g., circuitry, logic) operable to control operations of a memory die 160. In some examples, a local memory controller 165 may be operable to communicate (e.g., receive or transmit data or commands or both) with a memory system controller 155. In some examples, a memory system 110 may not include a memory system controller 155, and a local memory controller 165 or an external memory controller 120 may perform various functions described herein. As such, a local memory controller 165 may be operable to communicate with a memory system controller 155, with other local memory controllers 165, or directly with an external memory controller 120, or a processor 125, or any combination thereof. Examples of components that may be included in a memory system controller 155 or a local memory controller 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, sense components for sensing states of memory cells of a memory array 170, write components for writing states to memory cells of a memory array 170, or various other components operable for supporting described operations of a memory system 110.

A host system 105 (e.g., an external memory controller 120) and a memory system 110 (e.g., a memory system controller 155) may communicate information (e.g., data, commands, control information, configuration information) using one or more channels 115. Each channel 115 may be an example of a transmission medium that carries information, and each channel 115 may include one or more signal paths (e.g., a transmission medium, an electrical conductor, an electrically conductive path) between terminals associated with the components of the system 100. For example, a channel 115 may be associated with a first terminal (e.g., including one or more pins, including one or more pads) at the host system 105 and a second terminal at the memory system 110. A terminal may be an example of a conductive input or output point of a device of the system 100, and a terminal may be operable to act as part of a channel 115. In some implementations, at least the channels 115 between a host system 105 and a memory system 110 may include or be referred to as a host interface (e.g., a physical host interface). In some implementations, a host interface may include or be associated with interface circuitry (e.g., signal drivers, signal latches) at the host system 105 (e.g., at an external memory controller 120), or at the memory system 110 (e.g., at a memory system controller 155), or both.

In some examples, a channel 115 (e.g., associated signal paths and terminals) may be dedicated to communicating one or more types of information. For example, the channels 115 may include one or more command and address channels, one or more clock signal channels, one or more data channels, among other channels or combinations thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols of a signal may be registered for each clock cycle (e.g., on both a rising edge and a falling edge of a clock signal).

In some examples, at least a portion of the system 100 may implement a stacked die architecture in which multiple semiconductor dies are physically and communicatively coupled. In some implementations, one or more semiconductor dies may include multiple instances of interface circuitry (e.g., of a memory system 110, memory interface blocks) that are each associated with accessing a respective set of one or more memory arrays of one or more other semiconductor dies. The interface circuitry may perform operations, such as initialization operations, evaluation operations, configuration operations, access operations, or other operations based on information (e.g., instructions, parameters, configuration information) stored at the memory system 110.

In accordance with examples as disclosed herein, a memory system 110 may include a common logic block (e.g., logic circuitry) that is operable to output an indication to each of a set of multiple interface blocks to execute an initialization program, an evaluation program, or both. For example, the common logic block may receive a command (e.g., from a host system 105, from an external device) to initialize or evaluate operations associated with one or more memory arrays 170 of the memory system 110. The common logic block may output an indication of a set of instructions (e.g., a program) associated with the initialization or evaluation. The interface blocks may, using the received indication, obtain the instructions (e.g., from a non-volatile storage of the memory system 110) and execute one or more operations associated with the instructions. In some examples, the common logic block may output the indication in response to identifying a power-on condition (e.g., as part of a boot protocol). In some cases, the one or more operations may include evaluations of interface blocks or associated memory arrays 170 for proper operations, for establishing trim settings (e.g., for accessing memory cells of the memory arrays 170), for determining whether to repair components of the memory system 110 (e.g., row repair, column repair, TSV repair), or any combination thereof. Such techniques may support efficient initialization and evaluation of the memory system 110, which may improve performance of a system 100.

In addition to applicability in systems as described herein, boot and initialization techniques for stacked memory architectures may be generally implemented to support artificial intelligence applications. As the use of artificial intelligence increases to support machine learning, analytics, decision making, or other related applications, electronic devices that support artificial intelligence applications and processes may be desired. For example, artificial intelligence applications may be associated with accessing relatively large quantities of data for analytical purposes and may benefit from memory systems capable of effectively and efficiently storing relatively large quantities of data or accessing stored data relatively quickly. Implementing the techniques described herein may support artificial intelligence or machine learning techniques by supporting efficient initialization and testing of high-bandwidth memory systems, including coordinated initialization and testing of a relatively high quantity of interfaces (e.g., channels, data paths, support stacks) between a host and memory arrays of one or more semiconductor dies that are stacked over a logic die, among other benefits.

Figure 2:
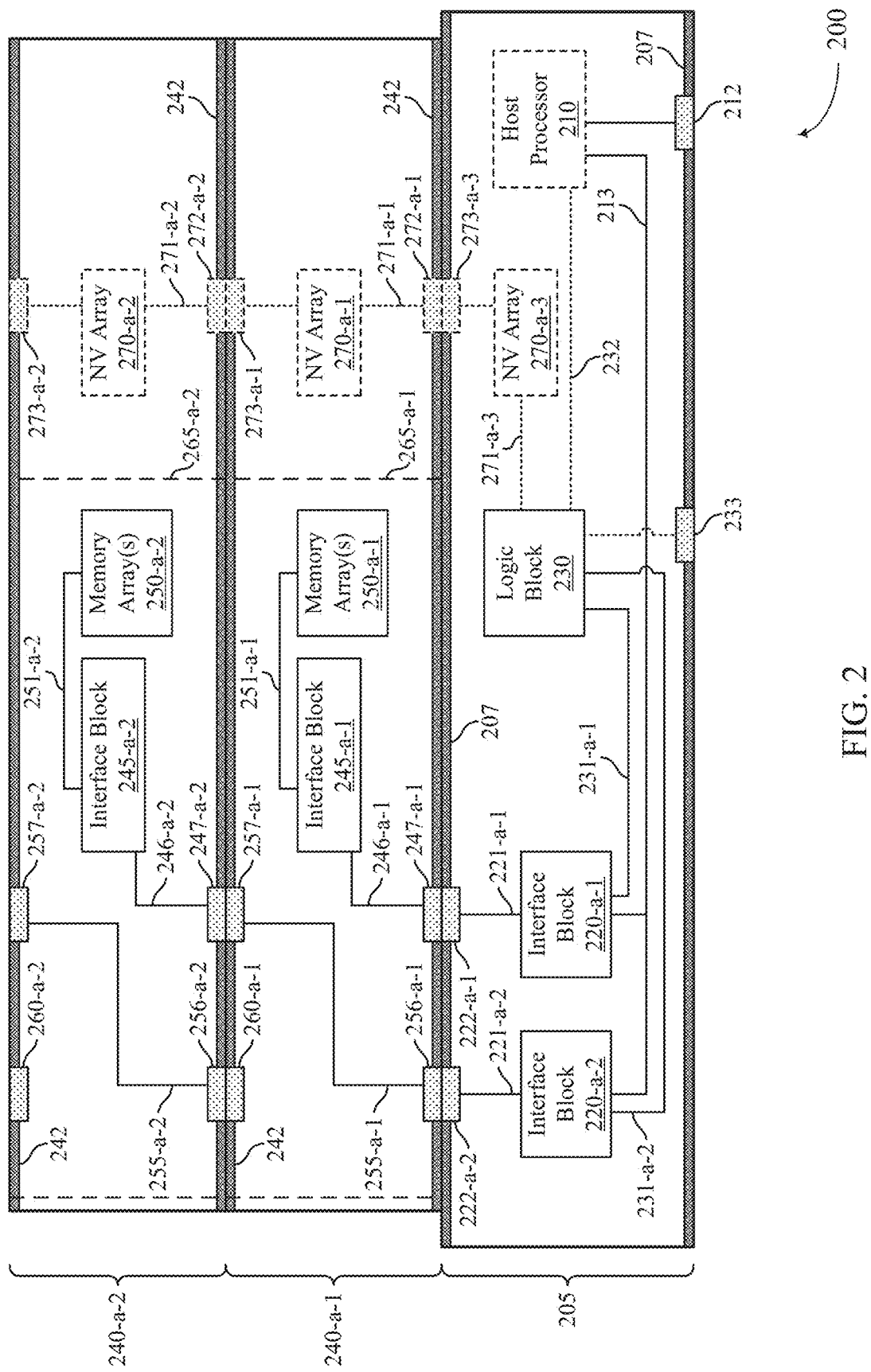
FIG. 2 shows an example of a system that supports boot and initialization techniques for stacked memory architectures in accordance with examples as disclosed herein.

FIG. 2 illustrates an example of a system 200 (e.g., a semiconductor system, a system of coupled semiconductor dies) that supports boot and initialization techniques for stacked memory architectures in accordance with examples as disclosed herein. The system 200 illustrates an example of a die 205 (e.g., a semiconductor die, a host die, a processor die, a logic die) that is coupled with one or more dies 240 (e.g., dies 240-*a*-1 and 240-*a*-2, semiconductor dies, memory dies, array dies). A die 205 or a die 240 may be formed using a respective semiconductor substrate (e.g., a substrate of crystalline semiconductor material such as silicon, germanium, silicon-germanium, gallium arsenide, or gallium nitride), or a silicon-on-insulator (SOI) substrate (e.g., silicon-on-glass (SOG), silicon-on-sapphire (SOS)), or epitaxial semiconductor materials formed on another substrate, among other examples. Although the illustrated example of a system 200 includes two dies 240, a system 200 in accordance with the described techniques may include any quantity of one or more dies 240 coupled with a die 205. Further, although non-limiting examples of the system 200 herein are generally described in terms of applicability to memory systems, memory sub-systems, memory devices, or a combination thereof, examples of the system 200 are not so limited. For example, aspects of the present disclosure may be applied as well to any computing system, computing sub-system, processing system, processing sub-system, component, device, structure, or other types of systems or sub-systems used for applications such as data collecting, data processing, data storage, networking, communication, power, artificial intelligence, system-on-a-chip, control, telemetry, sensing and monitoring, digital entertainment, or any combination thereof.

The system 200 illustrates an example of interface circuitry between a host and memory (e.g., via a host interface, via a physical host interface) that is implemented in (e.g., divided between) multiple semiconductor dies (e.g., a stack of directly coupled dies). For example, the die 205 may include a set of one or more interface blocks 220 (e.g., interface blocks 220-a-1 and 220-a-2, memory interface blocks), and each die 240 may include a set of one or more interface blocks 245 and one or more memory arrays 250 (e.g., die 240-a-1 including an interface block 245-a-1 coupled with a set of one or more memory arrays 250-a-1, die 240-a-2 including an interface block 245-a-2 coupled with a set of one or more memory arrays 250-a-2). In some implementations, the die 205 also may include a host processor 210. However, in some other implementations, a host processor 210 may be external to a die 205, such as in another semiconductor die or other component that is coupled with (e.g., communicatively coupled with, directly coupled with, bonded with) the die 205 via one or more contacts 212. Although the example of system 200 is illustrated with one interface block 245 included in each die 240, a die 240 in accordance with the described techniques may include any quantity of one or more interface blocks 245, each coupled with a respective set of one or more memory arrays 250, and each coupled with a respective interface block 220 of a die 205. Thus, the interface circuitry of a system 200 may include one or more interface blocks 220 of a die 205, with each interface block 220 being coupled with (e.g., in communication with) a corresponding interface block 245 of a die 240 (e.g., external to the die 205). In some examples, a coupled combination of an interface block 220 and an interface block 245 (e.g., coupled via a bus associated with one or more channels, such as one or more data channels, one or more control channels, one or more clock channels, or a combination thereof) may include or be referred to as a data path associated with a respective set of one or more memory arrays 250.

The host processor 210 may be an example of a host system 105, or a portion thereof (e.g., a processor 125, an external memory controller 120, or both). The host processor 210 may be configured to perform operations that implement storage of the memory arrays 250. For example, the host processor 210 may receive data read from the memory arrays 250, or may transmit data to be written to the memory arrays 250, or both (e.g., in accordance with an application or other operations of the host processor 210). The memory arrays 250 may be examples of memory arrays 170, and may include memory cells of various architectures, such as RAM, DRAM, SDRAM, SRAM, FeRAM, MRAM, RRAM, PCM, chalcogenide, NOR, or NAND memory cells, or any combination thereof.

The host processor 210 may be configured to communicate (e.g., transmit, receive) signaling with the interface blocks 220 over a host interface 213 (e.g., a physical host interface), which may implement aspects of channels 115 described with reference to FIG. 1. For example, the host processor 210 may be configured to transmit access signaling (e.g., control signaling, access command signaling, configuration signaling) over a host interface 213, which may be received by the interface blocks 220 to support access operations (e.g., read operations, write operations) on the memory arrays 250.

A host interface 213 may include a respective set of one or more signal paths for each interface block 220, such that the host processor 210 may communicate with each interface block 220 over the respective set of signal paths (e.g., in accordance with a selection of the respective set to perform access operations via an interface block 220 that is selected by the host processor 210). Additionally, or alternatively, a host interface 213 may include one or more signal paths that are shared among multiple interface blocks 220, and an interface block 220, or a host processor 210, or both may interpret, ignore, respond to, or inhibit response to signaling over shared signal paths of the host interface 213 based on a logical indication (e.g., an addressing indication associated with the interface block 220 or an interface enable signal, which may be provided by the host processor 210 or the corresponding interface block 220, depending on signaling direction). In some examples, a host interface 213 may include one or more instances of control circuitry (e.g., memory controller circuitry), which may be associated with implementing aspects of an external memory controller 120. In some other examples, such control circuitry may be included in the host processor 210.

The die 205 may also include a logic block 230 (e.g., a shared logic block, a central logic block, common logic circuitry), which may be configured to communicate (e.g., transmit, receive) signaling with the interface blocks 220 of the die 205. In some cases, the logic block 230 may be configured to transmit information, which may include commands, indications, data, or other information to the interface blocks 220 to facilitate operations of the interface blocks 220. For example, the logic block 230 may be configured to transmit initialization or other configuration signaling, which may be received by the interface blocks 220 to support initialization or other configuration of the interface blocks 220 or other aspects of operating the dies 240 (e.g., via the respective interface blocks 245). The logic block 230 may be coupled with each interface block 220 via a respective bus 231 (e.g., bus 231-a-1 associated with the interface block 220-a-1, bus 231-a-2 associated with the interface block 220-a-2). In some examples, the respective buses 231 may each include a respective set of one or more signal paths, such that the logic block 230 may communicate with each interface block 220 over the respective set of signal paths. Additionally, or alternatively, the respective buses 231 may include one or more signal paths that are shared among multiple interface blocks 220 (not shown).

In some implementations, the logic block 230 may be configured to communicate (e.g., transmit, receive) signaling with the host processor 210 (e.g., over a bus 232, via a contact 212 for a host processor 210 external to a die 205) such that the logic block 230 may support an interface between the interface blocks 220 and the host processor 210. For example, the host processor 210 may be configured to transmit initialization signaling (e.g., boot commands), or other configuration or operational signaling, which may be received by the logic block 230 to support initialization, configuration, or other operation of the interface blocks 220. Additionally, or alternatively, in some implementations, the logic block 230 may be configured to communicate (e.g., transmit, receive) signaling with a component outside the system 200 (e.g., via a contact 233), such that the logic block 230 may support an interface that bypasses a host processor 210. In some examples, such implementations may support evaluations, configurations, or other operations of the system 200, via contacts 233 that are accessible at a physical interface of the system, during manufacturing, assembly, validation, or other operation associated with the system 200 (e.g., before coupling with a host processor 210, without implementing a host processor 210, for operations independent of a host processor).

Each interface block 220 may be coupled with at least a respective bus 221 of the die 205, and a respective bus 246 of a die 240, that is configured to communicate signaling with the corresponding interface block 245 (e.g., over one or more associated signal paths). For example, the interface block 220-$a$-1 may be coupled with the interface block 245-$a$-1 via a bus 221-$a$-1 and a bus 246-$a$-1, and the interface block 220-$a$-2 may be coupled with the interface block 245-$a$-2 via a bus 221-$a$-2 and a bus 246-$a$-2. In some examples, a die 240 may include a bus that bypasses operational circuitry of the die 240 (e.g., bypasses interface blocks 245 of a given die 240), such as a bus 255. For example, the interface block 220-$a$-2 may be coupled with the interface block 245-$a$-2 of the die 240-$a$-2 via a bus 255-$a$-1 of the die 240-$a$-1, which may bypass interface blocks 245 of the die 240-$a$-1. Such techniques may be extended for interconnection among more than two dies 240 (e.g., for interconnection via a respective bus 255 of multiple dies 240).

The respective signal paths of the buses 221, 246, and 255 may be coupled with one another, from one die to another, via various arrangements of contacts at the surfaces of interfacing dies. For example, the bus 221-$a$-1 may be coupled with the bus 246-$a$-1 via a contact 222-$a$-1 of (e.g., at a surface of) the die 205 and a contact 247-$a$-1 of the die 240-$a$-1, the bus 221-$a$-2 may be coupled with the bus 255-$a$-1 via a contact 222-$a$-2 of the die 205 and a contact 256-$a$-1 of the die 240-$a$-1, the bus 255-$a$-1 may be coupled with the bus 246-$a$-2 via a contact 257-$a$-1 of the die 240-$a$-1 and a contact 247-$a$-2 of the die 240-$a$-2, and so on. Although each respective bus is illustrated with a single line, coupled via singular contacts, it is to be understood that each signal path of a given bus may be associated with respective contacts to support a separate communicative coupling via each signal path of the given bus. In some examples, a bus 255 may traverse a portion of a die 240) (e.g., in an in-plane direction, along a direction different from a thickness direction, in a waterfall arrangement), which may support an arrangement of contacts 222 along a surface of the die 205 being coupled with interface blocks 245 of different dies 240 along a stack direction (e.g., via respective contacts 256 and 257 that are non-overlapping when viewed along a thickness direction).

The interconnection of interfacing contacts may be supported by various techniques. For example, in a hybrid bonding implementation, interfacing contacts may be coupled by a fusion of conductive materials (e.g., electrically conductive materials) of the interfacing contacts (e.g., without solder or other intervening material between contacts). For example, in an assembled condition, the coupling of the die 205 with the die 240-$a$-1 may include a conductive material of the contact 222-$a$-2 being fused with a conductive material of the contact 256-$a$-1, and the coupling of the die 240-$a$-1 with the die 240-$a$-2 may include a conductive material of the contact 257-$a$-1 being fused with a conductive material of the contact 247-$a$-2, and so on. In some examples, such coupling may include an inoperative fusion of contacts (e.g., a non-communicative coupling, a physical coupling), such as a fusion of the contact 260-$a$-1 with the contact 256-$a$-2, neither of which are coupled with operative circuitry of the dies 240-$a$-1 or 240-$a$-2. In some examples, such techniques may be implemented to improve coupling strength or uniformity (e.g., implementing contacts 260), which may not be operatively coupled with an interface block 245 or an interface block 220), or such a coupling may be a byproduct of a repetition of components that, in various configurations, may be operative or inoperative. (e.g., where, for dies 240 with a common arrangement of contacts 256 and 257, contacts 256-$a$-1 and 257-$a$-1 provide a communicative path between the interface block 245-$a$-2 and the interface block 220-$a$-2, but the contacts 256-$a$-2 and 257-$a$-2 do not provide a communicative path between an interface block 245 and an interface block 220).

In some examples, a fusion of conductive materials between dies (e.g., between contacts) may be accompanied by a fusion of other materials at one or more surfaces of the interfacing dies. For example, in an assembled condition, the coupling of the die 205 with the die 240-$a$-1 may include a dielectric material 207 (e.g., an electrically non-conductive material) of the die 205 being fused with a dielectric material 242 of the die 240-$a$-1, and the coupling of the die 240-$a$-1 with the die 240-$a$-2 may include a dielectric material 242 of the die 240-$a$-1 being fused with a dielectric material 242 of the die 240-$a$-2. In some examples, such dielectric materials may include an oxide, a nitride, a carbide, an oxide-nitride, an oxide-carbide, or other conversion or doping of a semiconductor material of the die 205 or dies 240, among other materials that may support such fusion. However, coupling among dies 205 and dies 240 may be implemented in accordance with other techniques, which may implement solder, adhesives, thermal interface materials, and other intervening materials.

In some examples, dies 240 may be coupled in a stack (e.g., forming a "cube" or other arrangement of dies 240), and the stack may subsequently be coupled with a die 205. In some examples, a respective set of one or more dies 240 may be coupled with each die 205 of multiple dies 205 formed in a wafer (e.g., in a chip-to-wafer bonding arrangement, before cutting the wafer of dies 205), and the dies 205, coupled with their respective set of dies 240, may be separated from one another (e.g., by cutting at least the wafer of dies 205). In some other examples, a respective set of one or more dies 240 may be coupled with a respective die 205 after the die 205 is separated from a wafer of dies 205 (e.g., in a chip-to-chip bonding arrangement).

The buses 221, 246, and 255 may be configured to provide a configured signaling (e.g., a coordinated signaling, a logical signaling, modulated signaling, digital signaling) between an interface block 220 and a corresponding interface block 245, which may involve various modulation or encoding techniques by a transmitting interface block (e.g., via a driver component of the transmitting interface block). In some examples, such signaling may be supported by (e.g., accompanied by) clock signaling communicated via the respective buses (e.g., in coordination with signal transmission). For example, the buses may be configured to convey one or more clock signals transmitted by the interface block 220 for reception by the interface block 245 (e.g., to trigger signal reception by a latch or other reception component of the interface block 245, to support clocked operations of the interface block 245). Additionally, or alternatively, the buses may be configured to convey one or more clock signals transmitted by the interface block 245 for reception by the interface block 220 (e.g., to trigger signal reception by a latch or other reception component of the interface block 220, to support clocked operations of the interface block 220). Such clock signals may be associated with the communication (e.g., unidirectional communication, bidirectional communication) of various signaling, such as control signaling, command signaling, data signaling, or any combination thereof. For example, the buses may include one or more signal paths for communications of a data bus (e.g., one or more data channels, a DQ bus, via a data interface of the interface blocks) in accordance with one or more corresponding clock signals (e.g., data clock signals), or one or more signal paths for communications of a control bus (e.g., a command/address (C/A) bus, via a command interface of the interface blocks) in accordance with one or more clock signals (e.g., control clock signals), or any combination thereof.

Interface blocks 220, interface blocks 245, and logic block 230 each may include circuitry (signaling circuitry, multiplexing circuitry, processing circuitry, controller circuitry) in various configurations (e.g., hardware configurations, logic configurations, software or instruction configurations) that support the functionality allocated to the respective block for accessing or otherwise operating a corresponding set of memory arrays 250. For example, interface blocks 220 may include circuitry configured to perform a first subset of operations that support access of the memory arrays 250, and interface blocks 245 may include circuitry configured to support a second subset of operations that support access of the memory arrays 250. In some examples, the interface blocks 220 and 245 may support a functional split or distribution of functionality associated with a memory system controller 155, a local memory controller 165, or both across multiple dies (e.g., a die 205 and at least one die 240)). In some implementations, a logic block 230) may be configured to coordinate or configure aspects of the operations of the interface blocks 220, of the interface blocks 245, or both. Such operations, or subsets of operations, may include operations performed in response to commands from the host processor 210, or operations performed without commands from the host processor 210 (e.g., operations determined or initiated by an interface block 220, operations determined or initiated by an interface block 245, operations determined or initiated by a logic block 230), or various combinations thereof.

In some examples, the circuitry of interface blocks 220, interface blocks 245, or logic block 230, or any combination thereof may include components (e.g., transistors) formed at least in part from doped portions of a substrate of the respective die. In some examples, a substrate of a die 205 may have characteristics that are different from those of a substrate of a die 240. Additionally, or alternatively, in some examples, transistors formed from a substrate of a die 205 may have characteristics that are different from transistors formed from a substrate of a die 240 (e.g., in accordance with different transistor architectures).

A die 240 may include one or more units 265 (e.g., modules) that are separated from a semiconductor wafer having a pattern (e.g., a two-dimensional pattern) of units 265. Although each die 240 of the system 200 is illustrated with a single unit 265 (e.g., unit 265-*a*-1 of die 240-*a*-1, unit 265-*a*-2 of die 240-*a*-2), a die 240 in accordance with the described techniques may include any quantity of units 265, which may be arranged in various patterns (e.g., sets of one or more units 265 along a row direction, sets of one or more units 265 along a column direction, among other patterns). Each unit 265 may include at least the circuitry of a respective interface block 245, along with memory array(s) 250, a bus 251, a bus 246, and one or more contacts 247 corresponding to the respective interface block 245. In some examples, where applicable, each unit 265 may also include one or more buses 255, contacts 256, contacts 257, or contacts 260 (e.g., associated with a respective interface block 245 of a unit 265 of a different die 240), which may support various degrees of stackability or modularity among or via units 265 of other dies 240.

In some examples, the interface blocks 220 may include circuitry configured to receive first access command signaling from the host processor 210 (e.g., via a host interface 213, via one or more contacts 212 from a host processor 210 external to a die 205), and to transmit second access command signaling to the respective (e.g., coupled) interface block 245 based on (e.g., in response to) the received first access command signaling. The interface blocks 245 may accordingly include circuitry configured to receive the second access command signaling from the respective interface block 220, and to access a respective set of one or more memory arrays 250 based on (e.g., in response to) the received second access command signaling. In various examples, the first access command signaling may include access commands that are associated with a type of operation (e.g., a read operation, a write operation, a refresh operation, a memory management operation), which may be associated with an indication of an address of the one or more memory arrays 250 (e.g., a logical address, a physical address). In some examples, the first access command signaling may include an indication of a logical address associated with the memory arrays 250, and circuitry of an interface block 220 may be configured to generate the second access command signaling to indicate a physical address associated with the memory arrays 250 (e.g., a row address, a column address, using a logical-to-physical (L2P) table or other mapping or calculation functionality of the interface block 220).

In some examples, to support write operations of the system 200, circuitry of the interface blocks 220 may be configured to receive (e.g., from the host processor 210, via a host interface 213, via one or more contacts 212 from a host processor 210 external to a die 205) first data signaling associated with the first access command signaling, and to transmit second data signaling (e.g., associated with second access command signaling) based on received first access command signaling and first data signaling. The interface blocks 245 may accordingly be configured to receive second data signaling, and to write data to one or more memory arrays 250 (e.g., in accordance with an indicated address associated with the first access command signaling) based on the received second access command signaling and second data signaling. In some examples, the interface blocks 220 may include an error control functionality (e.g., error detection circuitry, error correction circuitry, error correction code (ECC) logic, an ECC engine) that supports the interface blocks 220 generating the second data signaling based on performing an error control operation using the received first data signaling (e.g., detecting or correcting an error in the first data signaling, determining one or more parity bits to be conveyed in the second data signaling and written with the data).

In some examples, to support read operations of the system 200, circuitry of the interface blocks 245 may be configured to read data from the memory arrays 250 based on received second access command signaling, and to transmit first data signaling based on the read data. The interface blocks 220 may accordingly be configured to receive first data signaling, and to transmit second data signaling (e.g., to the host processor 210, via a host interface 213, via one or more contacts 212 to a host processor 210 external to a die 205) based on the received first data signaling. In some examples, the interface blocks 220 may include an error control functionality that supports the interface blocks 220 generating the second data signaling based on performing an error control operation using the received first data signaling (e.g., detecting or correcting an error in the first data signaling, which may include a calculation involving one or more parity bits received with the first data signaling).

In some examples, access command signaling that is transmitted by the interface blocks 220 to the interface blocks 245 may be generated (e.g., based on access command signaling received from a host processor 210, based on initiation signaling received from a host processor 210, without receiving or otherwise independent from signaling from a host processor 210) in accordance with various determination or generation techniques configured at the interface blocks 220 (e.g., based on a configuration for accessing memory arrays 250 that is modified at the interface blocks 220). Such techniques may support the interface blocks 220 configuring aspects of the access operations performed on the memory arrays 250 by a respective interface block 245.

In some implementations, operations of the logic block 230, of the interface blocks 220, of the interface blocks 245, or of the memory arrays 250, or any combination thereof may be supported by information stored at the system 200. For example, a system 200 may include one or more storage locations, such as non-volatile (NV) arrays 270, which may be configured to store such information and output the information to one or more components of the system 200 to support the relevant operations. Such storage locations may be configured in various arrangements in a system 200. For example, NV arrays 270 may be located in a die 205, or in one or more dies 240, or any combination thereof (e.g., in both a die 205 and one or more dies 240). Information may be written to one or more NV arrays 270 during manufacturing of a system 200, during (e.g., based on) operations of the system 200, or both. In some examples, NV arrays 270 may be implemented as read-only memory (ROM) arrays.

In some implementations, a logic block 230 may be configured to communicate signaling with one or more of the NV arrays 270 of a system 200 (e.g., with supporting circuitry associated with operations of the NV arrays 270). For example, a logic block 230 may be coupled with one or more NV arrays 270 via one or more buses 271, and respective contacts 272 and 273, where applicable, which may each include one or more signal paths operable to communicate signaling (e.g., command signaling, data signaling) between the logic block 230 and the one or more NV arrays 270. In some examples, the interface blocks 220 may be configured to communicate signaling with one or more NV arrays 270, such that each interface block 220 may be coupled with one or more NV arrays 270 via a logic block 230 (e.g., via a respective bus 231) or via one or more signal paths directly (not shown).

In some examples, the logic block 230 may receive a command (e.g., from a host system 105, from a host processor 210, from a device outside the system 200 via a contact 212 or a contact 233) to initialize or evaluate operations associated with memory arrays 250, the interface blocks 245, the interface blocks 220, or a combination thereof. The logic block 230 may output an indication of a set of instructions (e.g., a program) associated with the initialization or evaluation (or both) to the interface blocks 220, which may obtain the instructions (e.g., from an NV array 270) and perform (e.g., initiate) one or more operations associated with the instructions. In some examples, the logic block 230 may output the indication in response to identifying a power-on condition (e.g., as part of a boot protocol). In some cases, the one or more operations may include evaluations of interface blocks 220, interface blocks 245, memory arrays 250, or any combination thereof for proper operations, for establishing trim settings (e.g., for accessing memory cells of the memory arrays 250), for determining whether implement a repair solution of the system 200 (e.g., a row repair, a column repair, a TSV repair), or a combination thereof. Such techniques may support efficient initialization and evaluation of the system 200, which may further improve performance of the overall system.

Figure 3:
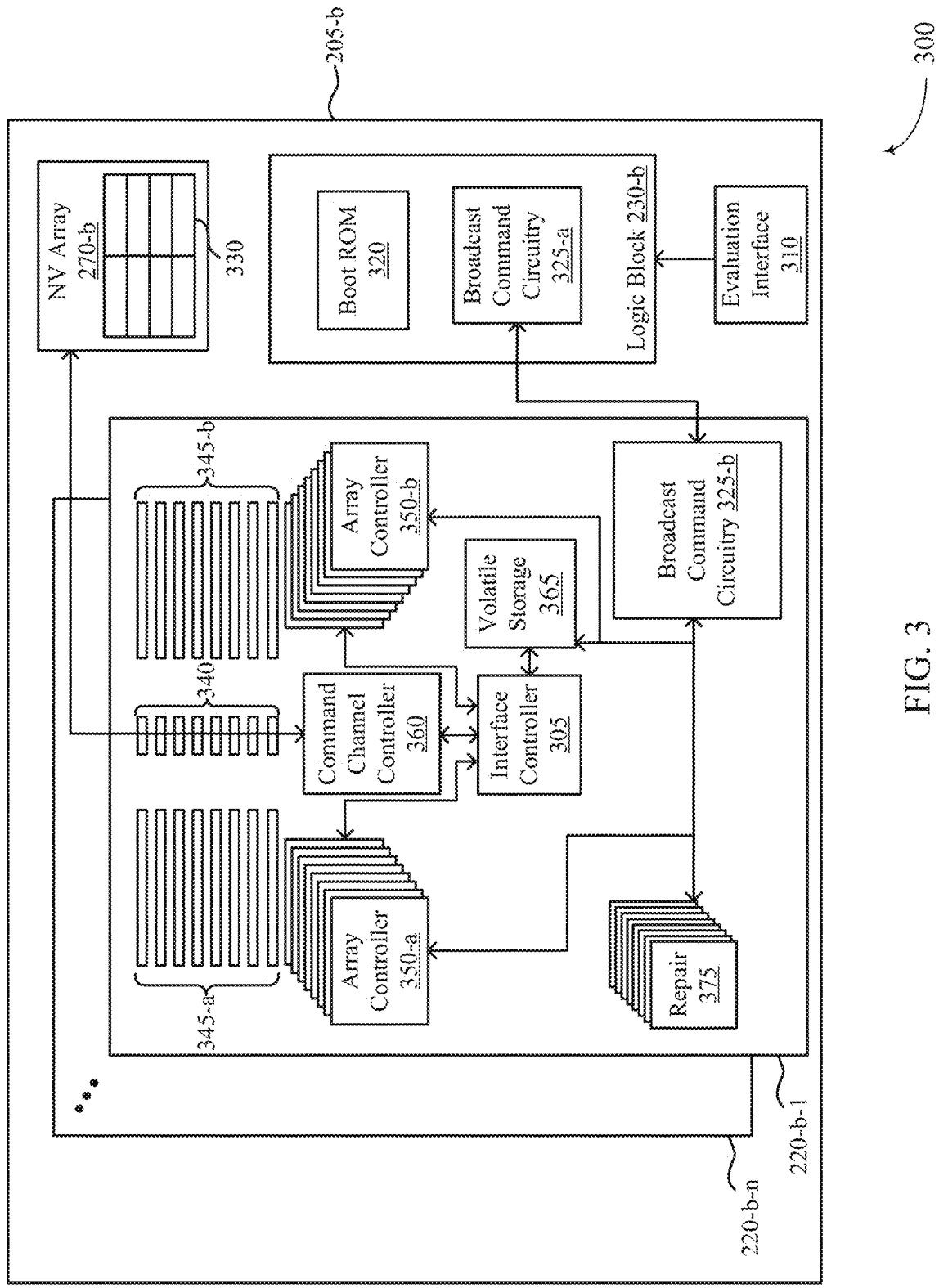
FIG. 3 shows an example of a system that supports boot and initialization techniques for stacked memory architectures in accordance with examples as disclosed herein.

FIG. 3 shows an example of a system 300 that supports boot and initialization techniques for stacked memory architectures in accordance with examples as disclosed herein. The system 300 may illustrate an implementation of aspects of a system 100, a system 200, or both. For example, the system 300 may include a die 205-b having one or more interface blocks 220-b (e.g., interface blocks 220-b-1 through 220-b-n), coupled with a logic block 230-b (e.g., a common logic block). The die 205-b may be coupled with one or more dies 240 (not shown) that include components corresponding to each of the interface blocks 220-b (e.g., as described with reference to FIG. 2). In some examples, the logic block 230-b may communicate signaling with the one or more interface blocks 220-b using broadcast command circuitry 325-a, and each interface block 220-b may include respective broadcast command circuitry 325-b. The broadcast command circuitry 325 may be associated with one or more channels (e.g., a bus, a bridge) between the logic block 230-b and each of the interface blocks 220-b.

As part of operating the system 300, the logic block 230-b, the one or more interface blocks 220-b, or a combination thereof may be operable to perform one or more programs (e.g., one or more sets of instructions), such as one or more initialization operations for the system 300, one or more evaluation operations for the system 300, or a combination thereof. For example, the logic block 230-b may be operable to initialize an interface controller 305 of each interface block 220-b. In some examples, each interface controller 305 may be operable to perform testing and repair operations of components of the respective interface block 220-b and memory arrays 250 associated therewith. For example, an interface controller 305 may be operable to execute a program to detect an error (e.g., a fault, a mechanical defect) in one or more rows or one or more columns (or both) of an associated memory array 250), detect an error associated with a TSV between dies (e.g., between a die 205 and a die 240, between dies 240, associated with buses 221, 246, or 255), perform calibration operations for components associated with operating respective memory arrays 250) (e.g., components of a respective interface block 245), or a combination thereof. In some cases, the interface controller 305 may support performing repair operations (e.g., in cooperation with a repair controller 375), to attempt to repair one or more detected errors.

In some examples, the system 300 may be operable to communicate with another system, such as a host system 105, or an evaluation probe, or both. To support such communication, the system 300 may include an evaluation interface 310, which may be operable to translate or otherwise respond to signaling received via one or more contacts, such as contacts 233, associated with the evaluation interface 310 (e.g., signaling from the external system) by generating control signaling for operations with the logic block 230-*b*. For example, a host system 105 or other device coupled with the evaluation interface 310 may transmit control signaling to the evaluation interface 310 to invoke evaluation protocols (e.g., configuration settings, data patterns, access patterns, registers), which may be associated with instructions stored at the evaluation interface 310. Such protocols may be called to initiate various programs of the one or more programs, such as initialization operations for the system 300, evaluation operations for the system 300, or both. In some examples, the evaluation interface 310 may provide external access to the system 300, such as an IEEE 1500 interface or other dedicated access logic.

The system 300 may store the one or more programs in an NV array 270-*b*. In some implementations, the NV array 270-*b* may include an array of one-time programmable (OTP) elements 330, which may be examples of fuses, antifuses, or other read-only memory elements. The OTP memory elements 330 may be configured to store information and be accessed by interface blocks 220-*b* using a command channel controller 360 of each of the interface blocks 220-*b*. For example, the command channel controller 360 may be configured to communicate information from the OTP memory elements 330 to the interface controller 305 (e.g., via command channels 340). Although illustrated as being included in the die 205-*b* (e.g., in the logic block 230-*b*), the NV array 270-*b* may be separate from (e.g., external to) the logic block 230-*b*. For example, one or more NV arrays 270 associated with the system 300 may be included in a die 240, or one or more other portions of a die 205, or any combination thereof.

In some cases, multiple programs may be programmed (e.g., stored, written) to the NV array 270-*b*. For example, as part of manufacturing or assembly, one or more initialization programs, one or more evaluation programs, or both may be programmed to the NV array 270-*b*. Additionally, or alternatively, one or more programs may be programmed to the NV array 270-*b* during operation of the system 300 (e.g., by an external device, such as a host system 105). Such programs may include programs which configure the system 300 to perform a repair operation, programs which configure the system 300 to perform MBIST operations, or both.

The interface blocks 220-*b* may also include a quantity of array controllers 350-*a* and 350-*b*, which may be coupled with the interface controllers 305. The array controllers 350-*a* and 350-*b* may be configured to facilitate operations of the one or more memory array's 250, for example, by communicating information for operations of the one or more memory arrays 250 using the data channels 345-*a* and the data channels 345-*b*, respectively (e.g., to the memory arrays 250, to corresponding interface blocks 245). In some examples, the data channels 345 may be included in or otherwise associated with buses 221. A repair controller 375 may also be coupled with an interface controller 305, and may be configured to store repair information (e.g., column repair information, row repair information, redundancy information) for the one or more memory arrays 250.

The logic block 230-*b* may be operable to initiate the one or more programs as part of a power-on sequence of the system 300, or as part of a power-on sequence for a coupled host system 105, or both. For example, the logic block 230-*b* may receive a command, such as an initialization command to initialize the system 300 or an evaluation command to evaluate aspects of the system 300, from a host system 105 coupled with the system 300. In some cases, the logic block 230-*b* may receive the command using the evaluation interface 310.

The logic block 230-*b* may generate or obtain, using the received command, an indication of a program (e.g., an initialization program, an evaluation program). In some cases, the logic block 230-*b* may obtain the indication from a non-volatile storage associated with the logic block 230-*b*, such as a boot ROM 320. For example, the command may include one or more fields which identify the program, and the logic block 230-*b* may decode the command to obtain the indication of the program stored in the boot ROM 320. Additionally, or alternatively, the logic block 230-*b* may determine to initialize the system 300 in response to identifying a power-on condition (e.g., an application or availability of power, signaling indicative of a power-on condition). For example, the logic block 230-*b* may determine to initialize the system 300 as part of a power-on sequence, as part of a reset sequence, or both.

After receiving and, in some cases, decoding the command, or after determining to initialize the system 300, the logic block 230-*b* may output the indication to each of the interface blocks 220-*b* using the broadcast command circuitry 325-*a*. The broadcast command circuitry 325-*a* may be an example of or may implement aspects of a configuration and status ring (CSR) interface between the logic block 230-*b* and the interface blocks 220-*b*. In some examples, the logic block 230-*b* may broadcast the indication (e.g., concurrently) to each of the interface blocks 220-*b*.

Additionally, or alternatively, the logic block 230-*b* may output the indication to the interface blocks 220-*b* serially. For example, the interface blocks 220-*b* may be arranged in a ring or star configuration, in which each interface block 220-*b* (e.g., the broadcast command circuitry 325-*b* of each interface block 220-*b*) is communicatively coupled with one or more other interface blocks 220-*b* (e.g., one or more neighboring interface blocks 220-*b*). The logic block 230-*b* may output the indication to a first interface block 220-*b*, the first interface block 220-*b* may output the indication to a second interface block 220-*b* communicatively coupled with the first interface block 220-*b*, and so on, such that each interface block 220-*b* may receive the indication, either from the logic block 230-*b* or from a neighboring interface block 220-*b*.

Each interface block 220-*b* may receive the indication (e.g., via the broadcast command circuitry 325-*b*) and issue the indication to the interface controller 305. An interface controller 305 of an interface block 220-*b* may be an example of a processor operable to execute evaluation operations, such as testing operations, repair operations, or other aspects of a memory built-in self-test (MBIST) procedure for a memory array coupled with the interface block 220-*b*. Additionally, the interface controller 305 may be operable to execute general-purpose programs (e.g., instructions, code), such as a program stored in a volatile storage 365 coupled with the interface controller 305. The volatile storage 365 may act as a random access memory (RAM) for the interface controller 305, and may be implemented using various memory architectures, such as DRAM, SRAM, or other volatile memory architectures.

In response to receiving the indication, the interface controller 305 may obtain the program (e.g., one or more instructions corresponding to the program, code corresponding to the program) from the NV array 270-b. For example, the interface controller 305 may, using the command channel controller 360, issue a read command to the NV array 270-b via the command channel 340. The read command may include information included in the indication, such as a starting address (e.g., a starting address within the NV array 270-b) of the program, a size of the program (e.g., a quantity of bits of the program), or both. The NV array 270-b may process the read command and output the program to the interface controller 305 via the command channel 340. In some cases, the NV array 270-b may include or may be associated with a command queue or other circuitry, which may manage multiple incoming access commands (e.g., read commands from interface controllers 305 of multiple interface blocks 220-b).

After receiving the program, the interface controller 305 may store the program to the volatile storage 365, and may begin executing the program. After completing the program, the interface controller 305 may store an indication that the program is complete, such as one or more values associated with a status or result of the program to one or more status registers of the interface block 220-b. For example, if the program includes a repair operation, such as an operation to repair a row or column of a memory array associated with the interface block 220-b or an operation to repair a TSV associated with the interface block 220-b, the interface controller 305 may store an indication of the repaired component (e.g., an identifier of the component, an address of the component) to a status register of the repair controller 375. Additionally, if the program was unable to repair a component, the interface controller 305 may store an indication of the component, as well as an indication that the component is inoperable (e.g., faulty or otherwise defective).

The one or more status registers may each include one or more volatile memory cells (e.g., SRAM cells, flip-flop circuits), and may be accessed by the logic block 230-b, by a coupled host system 105, or both. For example, the one or more status registers may be communicatively coupled with the broadcast command circuitry 325-b, and the logic block 230-b, the host system 105, or both may read value stored in the one or more status registers via the broadcast command circuitry 325-a.

As part of initializing or evaluating the system 300, each interface controller 305 of the interface blocks 220-b of the system 300 may begin executing a program concurrently. However, because operating conditions may vary across different interface blocks 220-b, each interface block 220-b may complete the program at different times, or may perform different procedures associated with the program, or both. For example, if the program includes a repair operation, a first interface controller 305 of a first interface block 220-b may identify and attempt to repair one or more errors or faults associated with the first interface block 220-b, while a second interface controller 305 may not identify an error, and thus may not attempt a repair operation. Accordingly, the second interface controller 305 may complete the program before the first interface controller 305.

In some cases, the logic block 230-b, the host system, or both may wait until each interface block 220-b has completed the program (e.g., until each interface block 220-b has stored a value in one or more status registers indicating that the interface block 220-b has completed the program), or until a threshold quantity of interface blocks 220-b have completed the program. After reading the one or more status registers and determining that the interface blocks 220-b have completed the program, a coupled host system 105 may transmit a second command indicating a second program (e.g., via the evaluation interface 310) to the logic block 230-b. The logic block 230-b may output an indication of the second command to the interface blocks 220-b, which may each retrieve the second program from the NV array 270-b and begin executing the second program.

Additionally, or alternatively, an interface controller 305 may retrieve and begin executing the second program with an indication from the logic block 230-b (e.g., without a coupled host system 105 transmitting the second command). For example, the program may include an indication of the second program (e.g., may include a starting address of the second program, a size of the second program, or both). After completing the program, the interface controller 305 may use the indication included in the program to issue a read command (e.g., using the command channel controller 360) to the NV array 270-b. The NV array 270-b may output the second program to the interface controller 305, and the interface controller 305 may begin executing the second program. In some cases, including an indication of the second program within the program may be referred to as "chaining" the programs together.

Figure 4:
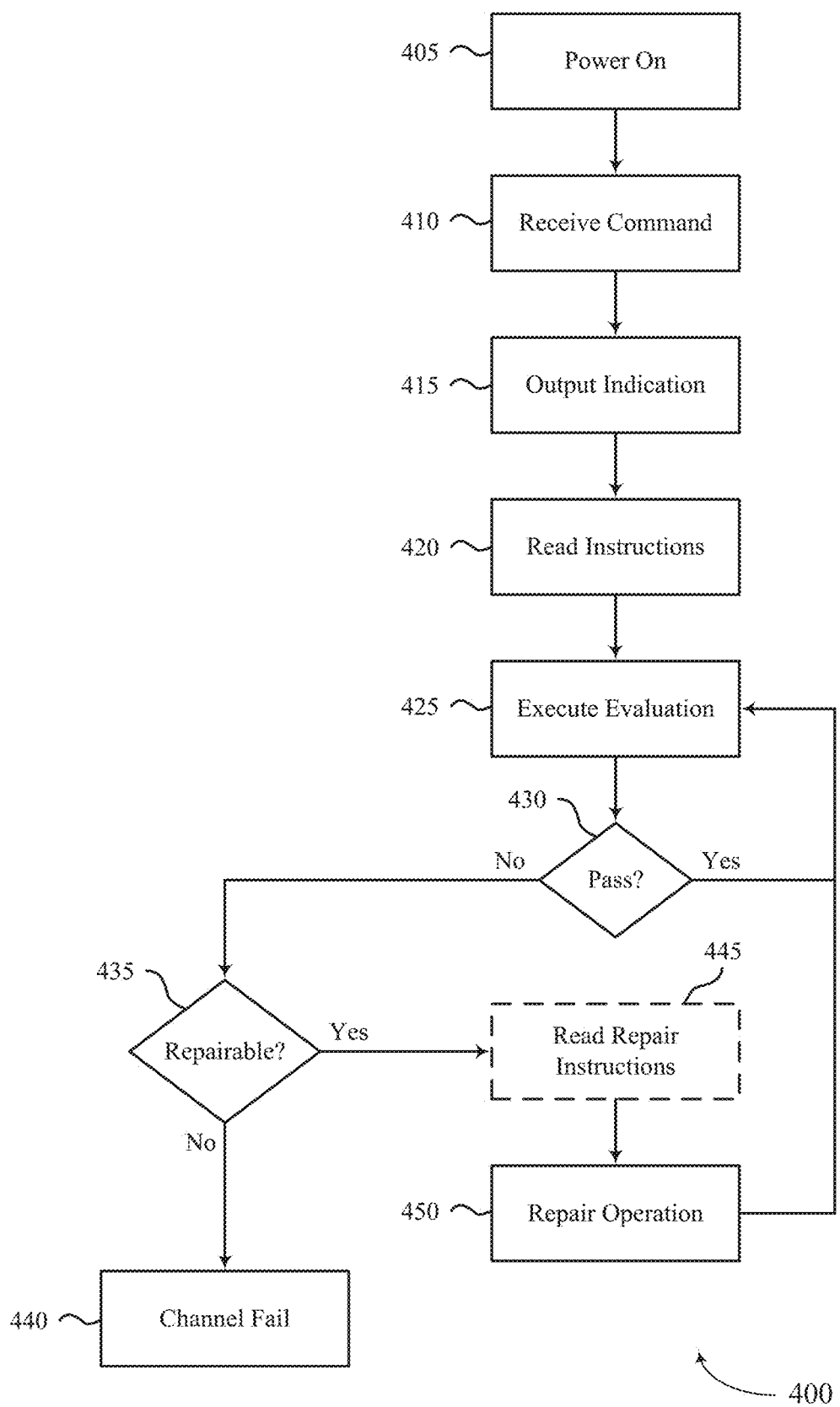
FIG. 4 shows an example of a process flow that supports boot and initialization techniques for stacked memory architectures in accordance with examples as disclosed herein.

FIG. 4 shows an example of a process flow 400 that supports boot and initialization techniques for stacked memory architectures in accordance with examples as disclosed herein. The process flow 400 may be implemented by aspects of a system 100, a system 200, a system 300, or a combination thereof. For example, aspects of the process flow 400 may be implemented by a logic block 230, one or more interface blocks 220 (e.g., one or more interface controllers 305 of the interface blocks 220), a host system 105, or a combination thereof. In the following description of process flow 400, the operations may be performed in a different order than the order shown. Additionally, one or more operations may be omitted from the process flow 400, and one or more operations may be added to process flow 400.

The process flow 400 may illustrate an example of an initialization method for a memory system 110 having a first semiconductor die (e.g., a die 205) which includes a logic block 230 and one or more interface blocks 220 operable to access one or more memory array's (e.g., one or more memory arrays 250, via respective interface blocks 245) of one or more second semiconductor dies (e.g., dies 240) of the memory system 110. In some cases, the logic block 230 may include non-volatile storage (e.g., boot ROM 320) operable to store instructions (e.g., code, a program) configured to implement aspects of the process flow 400. In some examples, each interface block 220 may include an interface controller 305 operable to read instructions, such as initialization programs, repair programs, training programs, calibrations programs, or any combination thereof, from one or more NV arrays 270 of the memory system 110. In some examples, aspects of the process flow 400 may be performed as part of a power on sequence for the memory system 110.

At 405, the memory system 110 may be powered on. As part of a power on sequence for the memory system 110, the logic block 230 may determine to initialize the memory system 110. In some cases, the logic block 230 may determine to initialize the memory system 110 in response to receiving one or more signals from a host system 105, such as a signal to transition into a default state, a reset signal, one or more clock signals, or a combination thereof.

Additionally, or alternatively, the memory system 110 may determine to initialize the memory system 110 in response to a command from a host system 105. For example, at 410, the logic block 230 may receive an initialization command from the host system 105, which may indicate a set of instructions (e.g., an initialization program) stored in one or more NV arrays 270. In some cases, the host system 105 may transmit the initialization command using an evaluation interface (e.g., an evaluation interface 310).

After receiving the initialization command, the logic block 230 may, at 415, output an indication of the set of instructions (e.g., an address associated with the one or more NV arrays 270 at which the set of instructions may be stored, a size of the set of instructions) to each interface controller 305 of the interface blocks 220. In some cases, the logic block 230 may transmit the indication using broadcast command circuitry 325-*b*, each interface block 220 may receive the indication using respective broadcast command circuitry 325-*b*.

The broadcast command circuitry 325-*b* may issue the indication to the interface controller 305, and the interface controller 305 may, at 420, read the set of instructions from the one or more NV arrays 270 using a command channel controller 360 and associated command channel 340. After receiving the set of instructions, the interface controller 305 may store the set of instructions to a volatile storage 365 and may, at 425, begin executing the instructions. In some examples, a single interface block 220 may be coupled with multiple memory arrays 250 using multiple data channels 345 (e.g., eight data channels). In such cases, the interface controller 305 may execute the set of instructions independently for each data channel 345. For example, the interface controller 305 may execute the set of instructions for a first data channel 345, may subsequently execute the set of instructions for a second data channel 345, and so on (e.g., the interface controller 305 may "loop" through each data channel 345).

In some cases, the set of instructions may include one or more evaluation operations for components associated with a data channel 345 of the interface block 220, such as one or more rows of memory cells of a memory array coupled with the data channel 345 of the interface block 220, one or more columns of memory cells of a memory array coupled with the data channel 345 of the interface block 220, one or more TSVs associated with the interface block 220 (e.g., TSVs between layers of memory arrays coupled with the interface block 220), or a combination thereof. For example, at 430, the interface controller 305 may determine whether a component passes the one or more evaluation operations. As described herein, a component may "pass" an evaluation operation if the evaluation operation does not detect or identify a fault or defect associated with the component.

If the component passes the evaluation operation, the process flow 400 may return to (e.g., may loop back to) 430, and the interface controller 305 may execute the evaluation operations for a subsequent channel. Alternatively, if the component does not pass the evaluation operation, the interface controller 305 determine, at 435, whether the component may be repaired. For example, the interface controller 305 may execute code included in the set of instructions to diagnose the component. If the interface controller 305 determines that the component is not repairable, the interface controller 305 may, at 440, determine that the component of the data channel 345 has failed. In some cases, the interface controller 305 may store a value to a register (e.g., a status register of the repair controller 375) to indicate the failed component. Additionally, the interface controller 305 may disable one or more memory cells associated with the failed component (e.g., may disable one or more memory cells of a failed row, may disable one or more memory arrays 250 of a failed column).

Alternatively, if the interface controller 305 determines that the component is repairable, the interface controller 305 may, at 450, execute a repair operation to repair the identified defect of the component. In some examples, the repair operation may be included in the set of instructions. Additionally, or alternatively, the repair operation may not be included in the set of instructions. In such cases, the set of instructions may include an indication of the repair operation, such as an address of an additional set of instructions which include the repair operation. The interface controller 305 may, at 445, read the additional set of instructions from one or more NV arrays 270 using the indication.

In some examples, after completing the repair operation, the interface controller 305 may store a value indicating the repaired component (e.g., within a status register of the repair controller 375). Additionally, the process flow 400 may return to (e.g., may loop back to) 430, and the interface controller 305 may execute the evaluation operations for a subsequent data channel 345.

Figure 5:
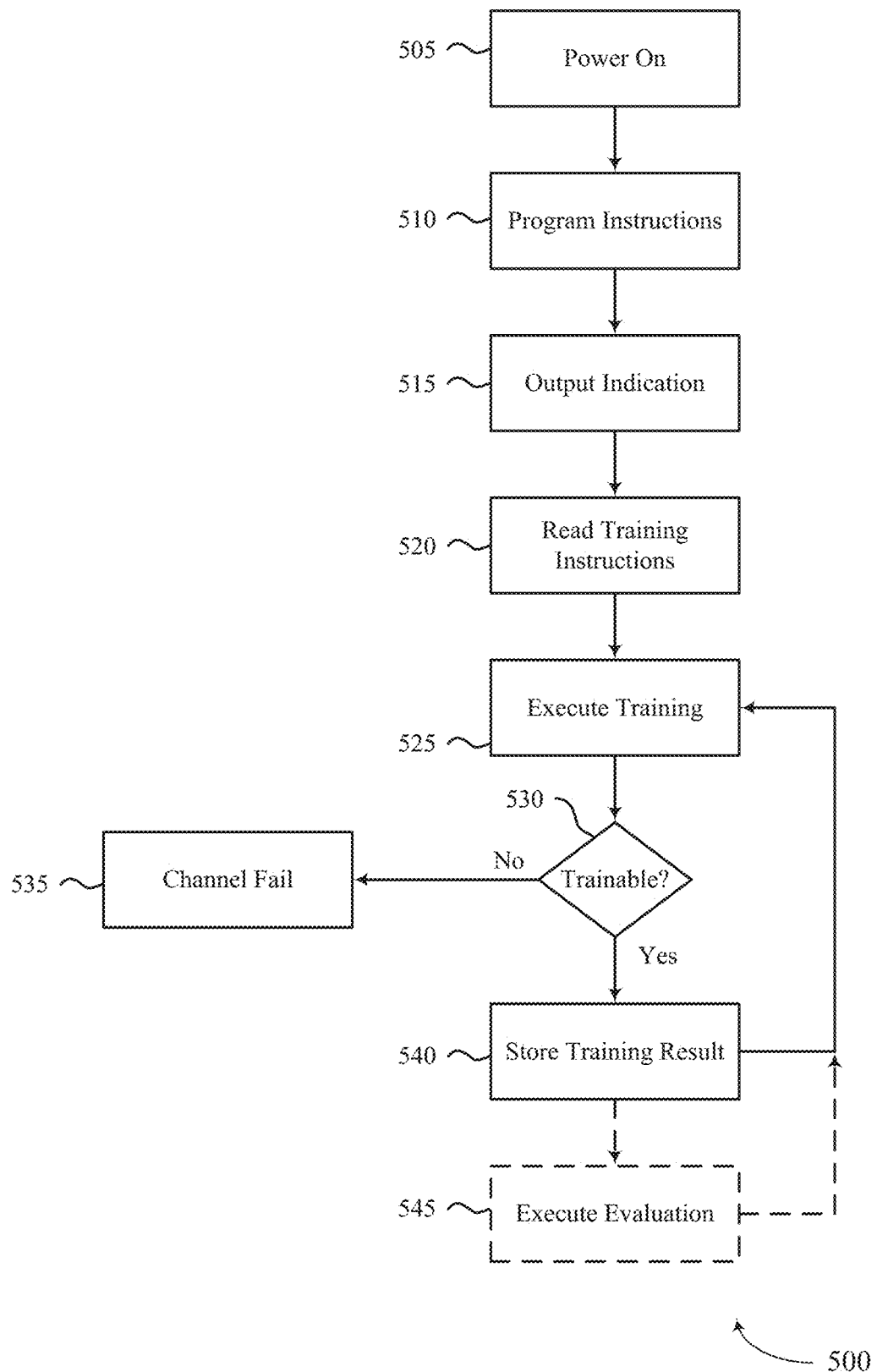
FIG. 5 shows an example of a process flow that supports boot and initialization techniques for stacked memory architectures in accordance with examples as disclosed herein.

FIG. 5 shows an example of a process flow 500 that supports boot and initialization techniques for stacked memory architectures in accordance with examples as disclosed herein. The process flow 500 may be implemented by aspects of a system 100, a system 200, a system 300, or a combination thereof. For example, aspects of the process flow 500 may be implemented by a logic block 230, one or more interface blocks 220 (e.g., one or more interface controllers 305 of the interface blocks 220), a host system 105, or a combination thereof. In the following description of process flow 500, the operations may be performed in a different order than the order shown. Additionally, one or more operations may be omitted from the process flow 500, and one or more operations may be added to process flow 500.

The process flow 500 may illustrate an example of a method to identify and store one or more operational parameters for a memory system 110 having a first semiconductor die (e.g., a die 205) which includes a logic block 230 and one or more interface blocks 220 operable to access one or more memory arrays (e.g., one or more memory arrays 250, via respective interface blocks 245) of one or more second semiconductor dies (e.g., dies 240) of the memory system 110. In some cases, the logic block 230 may include non-volatile storage (e.g., boot ROM 320) operable to store instructions (e.g., code, a program) configured to implement aspects of the process flow 500. Additionally, each interface block 220 may include an interface controller 305 operable to read instructions, such as initialization programs, repair programs, training programs, calibrations programs, or any combination thereof, from one or more NV arrays 270 of the memory system 110. In some examples, aspects of the process flow 500 may be performed as part of a manufacturing operation for the memory system 110.

At 505, the memory system 110 may be powered on. As part of a power on sequence for the memory system 110, the logic block 230 may determine to initialize the memory system 110. In some cases, the logic block 230 may determine to initialize the memory system 110 in response to receiving one or more signals from a host system 105, such as a signal to transition into a default state, a reset signal, one or more clock signals, or a combination thereof.

At 510, one or more sets of instructions may be programmed to one or more NV arrays 270. The one or more sets of instructions may include initialization programs, evaluation programs, training programs, or a combination thereof. In some cases, a manufacturing system may program the one or more sets of instructions to the one or more NV arrays 270. Additionally, or alternatively, a host system 105 may transmit one or more commands to the logic block 230, which may cause the logic block 230 to program the one or more instructions to one or more NV array 270. In examples of NV arrays 270 that include an array of OTP storage elements, programming the NV arrays 270 may include "blowing" or otherwise setting one or more of the OTP elements.

Additionally, or alternatively, the memory system 110 may determine to initialize the memory system 110 in response to a command from a coupled host system 105. For example, at 510, the logic block 230 may receive an initialization command from the host system 105, which may indicate a set of instructions (e.g., an initialization program) stored in one or more NV arrays 270. In some cases, the host system 105 may transmit the initialization command using an evaluation interface (e.g., an evaluation interface 310).

As part of the manufacturing operation, each interface controller 305 may execute one or more training programs to determine one or more operational parameters for accessing memory arrays 250) coupled with each interface controller 305, such as access voltages, voltage timings, TSV resistance, or a combination thereof. To execute the training programs, the logic block 230 may, at 515, output an indication of a set of instructions which include the training programs to each interface controller 305 of the interface blocks 220. In some cases, the logic block 230 may transmit the indication using broadcast command circuitry 325-b, and each interface block 220 may receive the indication using respective broadcast command circuitry 325-b.

The broadcast command circuitry 325-b may issue the indication to the interface controller 305, and the interface controller 305 may, at 520, read the set of instructions from one or more NV arrays 270) using a command channel controller 360 and associated command channel 340). After receiving the set of instructions, the interface controller 305 may store the set of instructions to a volatile storage 365 and may, at 525, begin executing the instructions. In some examples, a single interface block 220 may be coupled with multiple memory arrays 250 using multiple data channels 345 (e.g., eight data channels). In such cases, the interface controller 305 may execute the set of instructions independently for each data channel 345. For example, the interface controller 305 may execute the set of instructions for a first data channel 345, may subsequently execute the set of instructions for a second data channel 345, and so on (e.g., the interface controller 305 may "loop" through each data channel 345).

In some cases, the training programs may include, at 530, identifying whether aspects of a TSV of the channel are operable to be modified (e.g., whether the TSV is "trainable"). If the interface controller 305 determines that the TSV is not trainable, the interface controller 305 may, at 535, determine that the TSV of the data channel 345 has failed. In some cases, the interface controller 305 may store a value to a register (e.g., a status register of the repair controller 375) to indicate the failed TSV. Additionally, the interface controller 305 may disable one or more memory cells associated with the failed TSV.

Alternatively, if the interface controller 305 determines that the TSV is trainable, the interface controller 305 may, at 540, execute the training program (e.g., by calibrating the TSV). After completing the training program, the interface controller 305 may store an operational parameter resulting from the training programs (e.g., a configuration determined using the calibration). Additionally, the process flow 500 may return to (e.g., may loop back to) 530, and the interface controller 305 may execute the training programs for a subsequent data channel 345.

In some examples, after completing a training program for a data channel 345, the interface controller 305 may, at 545, execute one or more evaluation operations for the data channel 345. In such cases, the process flow 500 may include aspects of the process flow 400. For example, the process flow 500 may proceed to the operations of 425 of the process flow 400, and the interface controller 305 may execute one or more evaluation operations associated with the data channel 345.

Figure 6:
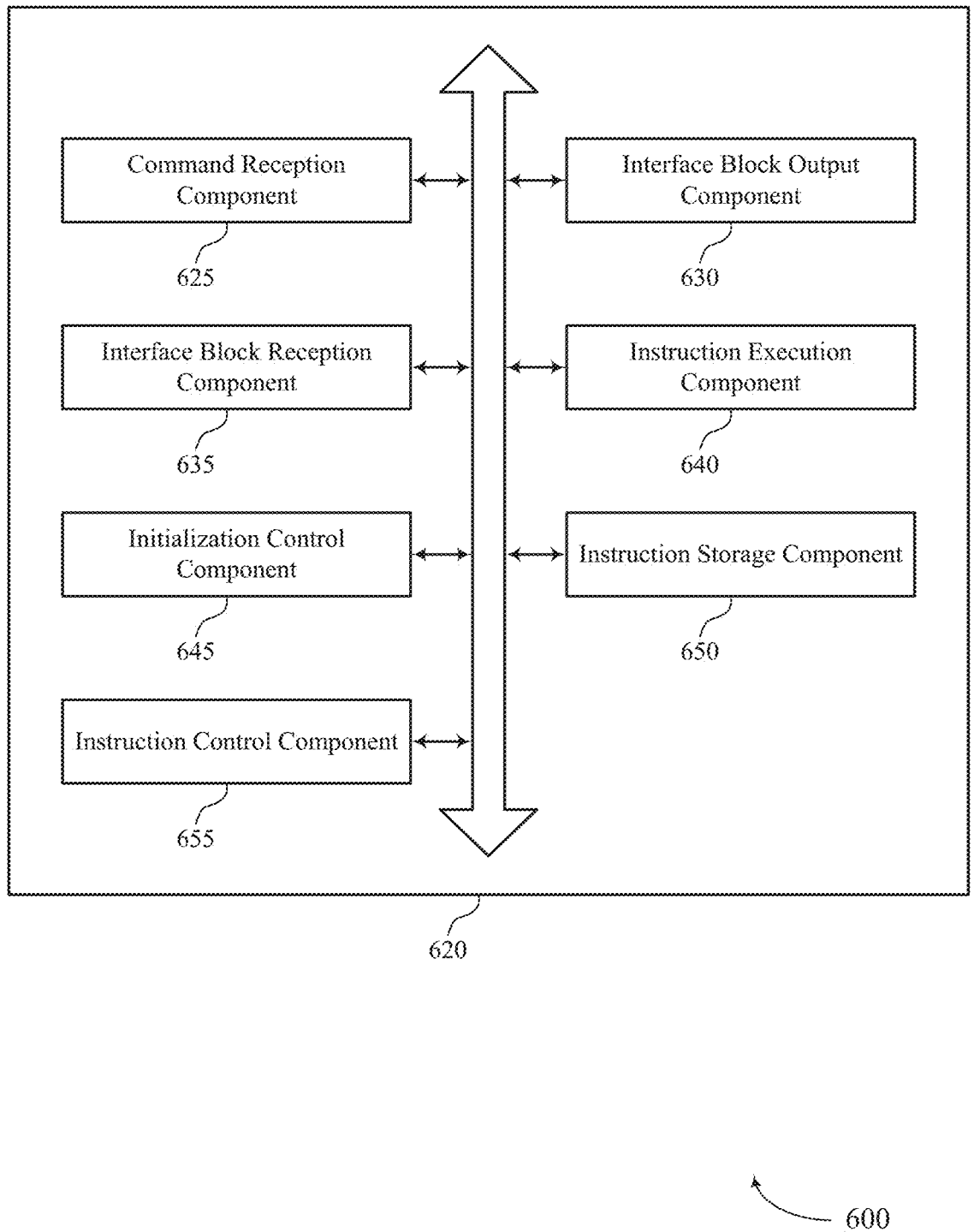
FIG. 6 shows a block diagram of a memory system that supports boot and initialization techniques for stacked memory architectures in accordance with examples as disclosed herein.

FIG. 6 shows a block diagram 600 of a memory system 620 that supports boot and initialization techniques for stacked memory architectures in accordance with examples as disclosed herein. The memory system 620 may be an example of aspects of a memory system as described with reference to FIGS. 1 through 5. The memory system 620, or various components thereof, may be an example of means for performing various aspects of boot and initialization techniques for stacked memory architectures as described herein. For example, the memory system 620 may include a command reception component 625, an interface block output component 630, an interface block reception component 635, an instruction execution component 640, an initialization control component 645, an instruction storage component 650, an instruction control component 655, or any combination thereof. Each of these components may communicate, directly or indirectly, with one another (e.g., via one or more buses).

The command reception component 625 may be configured as or otherwise support a means for receiving an initialization command at a common logic block of a first semiconductor die of the memory system 620, the common logic block coupled with a plurality of interface blocks of the first semiconductor die that are each operable to access (e.g., via a respective set of one or more channels) one or more respective memory arrays of one or more second semiconductor dies of the memory system 620. The interface block output component 630 may be configured as or otherwise support a means for outputting, based on receiving the initialization command, an indication of instructions for each interface block of the plurality of interface blocks. The interface block reception component 635 may be configured as or otherwise support a means for receiving, by each interface block of the plurality of interface blocks, the instructions based on the indication. The instruction execution component 640 may be configured as or otherwise support a means for performing (e.g., initiating), by each interface block of the plurality of interface blocks, one or more respective operations (e.g., initialization operations) based on the interface block receiving the instructions.

In some examples, the instruction storage component 650 may be configured as or otherwise support a means for storing, by each interface block of the plurality of interface blocks, the received instructions to a respective volatile storage component associated with the interface block, and each interface block performing the one or more respective initialization operations may be based on each interface block storing the received instructions.

In some examples, the instruction control component 655 may be configured as or otherwise support a means for storing, based on an interface block of the plurality of interface blocks completing the instructions, an indication associated with the completion by the interface block to a register.

In some examples, the interface block reception component 635 may be configured as or otherwise support a means for receiving second instructions based on a second indication included the instructions. In some examples, the instruction execution component 640 may be configured as or otherwise support a means for performing (e.g., initiating) one or more respective second operations based on receiving the second instructions.

In some examples, to support receiving the instructions, the interface block reception component 635 may be configured as or otherwise support a means for reading the instructions from non-volatile storage of the memory system 620 using a respective command channel of each interface block of the plurality of interface blocks.

In some examples, outputting the indication may be based on receiving the indication from a second non-volatile storage of the common logic block.

In some examples, each interface block of the plurality of interface blocks may be associated with a respective plurality of data channels between the interface block and the one or more respective memory arrays.

In some examples, the non-volatile storage may include one or more one-time programmable memory elements.

In some examples, to support receiving the initialization command, the command reception component 625 may be configured as or otherwise support a means for receiving, using an evaluation interface of the common logic block, the initialization command from a host system.

In some examples, the instruction execution component 640 may be configured as or otherwise support a means for determining, by each interface block of the plurality of interface blocks, whether to apply a row repair, a column repair, or a through-silicon via repair for accessing the one or more respective memory arrays based on performing the one or more respective initialization operations.

In some examples, the command reception component 625 may be configured as or otherwise support a means for receiving an evaluation command at a common logic block of a first semiconductor die of the memory system 620, the common logic block coupled with a plurality of interface blocks of the first semiconductor die that are each operable to access (e.g., via a respective set of one or more channels) one or more respective memory arrays of one or more second semiconductor dies of the memory system 620. In some examples, the interface block output component 630 may be configured as or otherwise support a means for outputting, based on receiving the evaluation command, an indication of an evaluation operation to each interface block of the plurality of interface blocks, the evaluation operation associated with evaluating access operations associated with the one or more respective memory arrays. In some examples, the interface block reception component 635 may be configured as or otherwise support a means for receiving, by each interface block of the plurality of interface blocks, instructions for the evaluation operation based on the indication. In some examples, the instruction execution component 640 may be configured as or otherwise support a means for performing one or more operations (e.g., initiating a portion of the instructions for the evaluation operation) by each interface block of the plurality of interface blocks based on receiving the instructions.

In some examples, the interface block reception component 635 may be configured as or otherwise support a means for receiving, by an interface block of the plurality of interface blocks, an indication of a second evaluation operation based on performing the instructions for the evaluation operation. In some examples, the instruction execution component 640 may be configured as or otherwise support a means for performing (e.g., initiating), by the interface block, a portion of the second evaluation operation based on receiving the second evaluation operation.

In some examples, the instruction control component 655 may be configured as or otherwise support a means for storing a value to a register associated with an interface block of the plurality of interface blocks, the value indicating that the interface block has completed the evaluation operation.

In some examples, the command reception component 625 may be configured as or otherwise support a means for receiving, at the common logic block and after storing the value, a second evaluation command. In some examples, the interface block output component 630 may be configured as or otherwise support a means for outputting, based on receiving the second evaluation command, a second indication of a second evaluation operation to each interface block of the plurality of interface blocks. In some examples, the interface block reception component 635 may be configured as or otherwise support a means for receiving, by each interface block of the plurality of interface blocks, the second evaluation operation based on outputting the indication. In some examples, the instruction execution component 640 may be configured as or otherwise support a means for initiating a portion of the second evaluation operation by each interface block of the plurality of interface blocks based on receiving the second evaluation operation.

In some examples, the evaluation operation may be written to a non-volatile storage of the memory system 620, and receiving the evaluation operation may include reading the evaluation operation from the non-volatile storage using a respective command channel of each interface block of the plurality of interface blocks.

In some examples, outputting the indication may be based on receiving the indication from a second non-volatile storage of the common logic block.

In some examples, each interface block of the plurality of interface blocks includes a respective plurality of data channels between the interface block and the one or more respective memory arrays.

In some examples, the evaluation operation includes a repair operation for one or more columns of memory cells associated with a memory array of the one or more respective memory arrays, a test operation for one or more through-silicon vias (TSVs) of the memory system 620, an operation associated with disabling one or more memory cells of the one or more respective memory arrays, or a combination thereof.

The initialization control component 645 may be configured as or otherwise support a means for determining, at a common logic block of a first semiconductor die of the memory system 620, to initialize the memory system 620, the common logic block coupled with a plurality of interface blocks of the first semiconductor die that are each operable to access one or more respective memory arrays of one or more second semiconductor dies of the memory system 620. In some examples, the interface block output component 630 may be configured as or otherwise support a means for outputting, based on determining to initialize the memory system 620, an indication of one or more instructions associated with initializing the memory system 620 to each interface block of the plurality of interface blocks. In some examples, the interface block reception component 635 may be configured as or otherwise support a means for receiving, by each interface block of the plurality of interface blocks, the one or more instructions based on outputting the indication. In some examples, the instruction execution component 640 may be configured as or otherwise support a means for performing (e.g., initiating) one or more instructions by each interface block of the plurality of interface blocks based on receiving the one or more instructions.

In some examples, determining to initialize the memory system 620 may be based on identifying a power on condition for the memory system 620.

In some examples, the command reception component 625 may be configured as or otherwise support a means for receiving an initialization command at the common logic block. In some examples, the interface block output component 630 may be configured as or otherwise support a means for outputting the indication based on receiving the initialization command.

Figure 7:
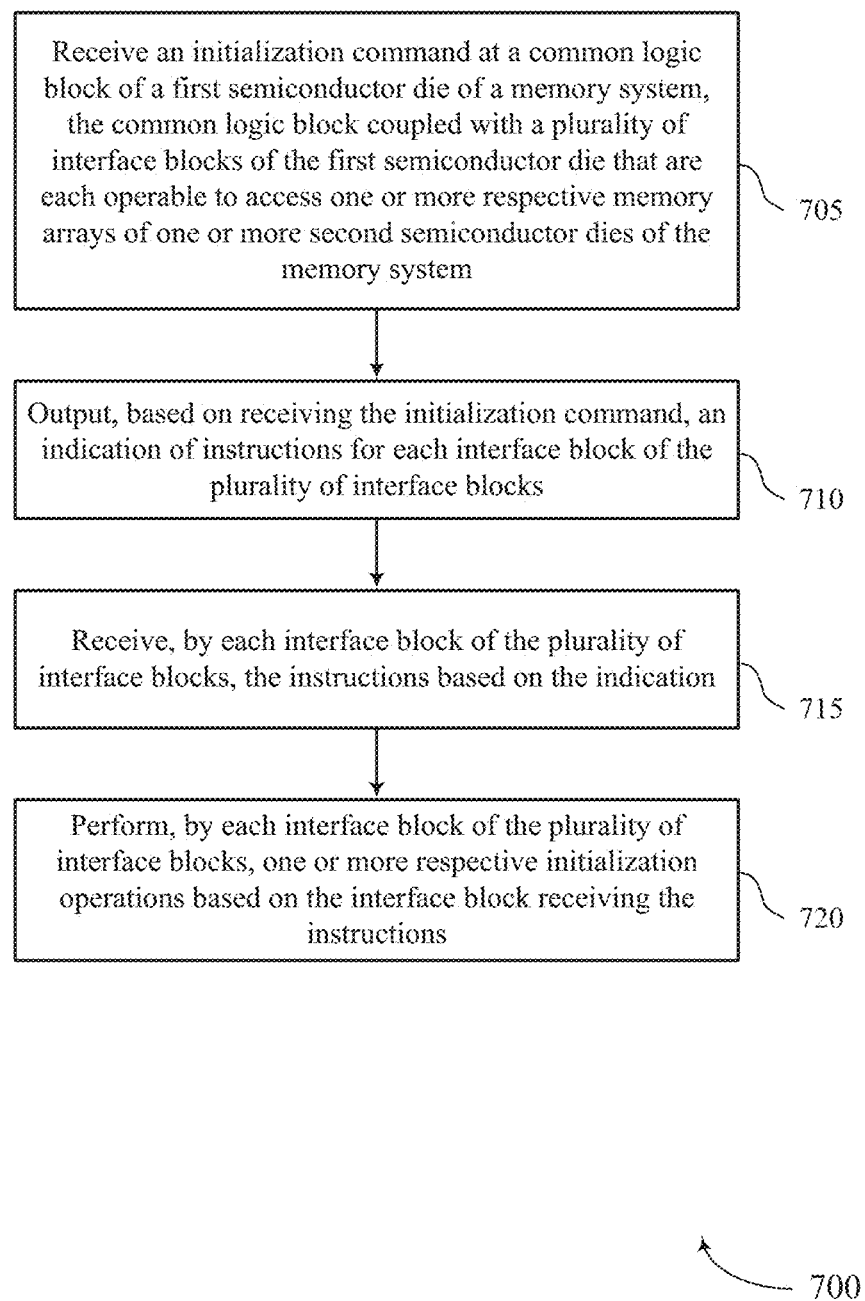
FIGS. 7 through 9 show flowcharts illustrating methods that support boot and initialization techniques for stacked memory architectures in accordance with examples as disclosed herein.

FIG. 7 shows a flowchart illustrating a method 700 that supports boot and initialization techniques for stacked memory architectures in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include receiving an initialization command at a common logic block of a first semiconductor die of a memory system, the common logic block coupled with a plurality of interface blocks of the first semiconductor die that are each operable to access (e.g., via a respective set of one or more channels) one or more respective memory arrays of one or more second semiconductor dies of the memory system. The operations of 705 may be performed in accordance with examples as disclosed herein. For example, the memory system may include a logic block 230 which receives signaling from a host device (e.g., using an evaluation interface 310).

At 710, the method may include outputting, based on receiving the initialization command, an indication of instructions for each interface block of the plurality of interface blocks. The operations of 710 may be performed in accordance with examples as disclosed herein. For example, the logic block 230 may include broadcast command circuitry 325 which outputs the indication to an interface block 220.

At 715, the method may include receiving, by each interface block of the plurality of interface blocks, the instructions based on the indication. The operations of 715 may be performed in accordance with examples as disclosed herein. For example, an interface block 220 may include a command channel controller 360 which receives the instructions from one or more NV arrays 270.

At 720, the method may include performing, by each interface block of the plurality of interface blocks, one or more respective initialization operations based on the interface block receiving the instructions. The operations of 720 may be performed in accordance with examples as disclosed herein. For example, an interface block 220 may include an interface controller 305 which executes the instructions.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving an initialization command at a common logic block of a first semiconductor die of a memory system, the common logic block coupled with a plurality of interface blocks of the first semiconductor die that are each operable to access (e.g., via a respective set of one or more channels) one or more respective memory arrays of one or more second semiconductor dies of the memory system: outputting, based on receiving the initialization command, an indication of instructions for each interface block of the plurality of interface blocks: receiving, by each interface block of the plurality of interface blocks, the instructions based on the indication; and performing, by each interface block of the plurality of interface blocks, one or more respective initialization operations based on the interface block receiving the instructions.

Aspect 2: The method, apparatus, or non-transitory computer-readable medium of aspect 1, further including operations, features, circuitry, logic, means, or instructions, or any combination thereof for storing, by each interface block of the plurality of interface blocks, the received instructions to a respective volatile storage component associated with the interface block, wherein each interface block performing the one or more respective initialization operations is based on each interface block storing the received instructions.

Aspect 3: The method, apparatus, or non-transitory computer-readable medium of any of aspects 1 through 2, further including operations, features, circuitry, logic, means, or instructions, or any combination thereof for storing, based on an interface block of the plurality of interface blocks completing the one or more respective initialization operations, an indication associated with the completion by the interface block to a register.

Aspect 4: The method, apparatus, or non-transitory computer-readable medium of any of aspects 1 through 3, further including operations, features, circuitry, logic, means, or instructions, or any combination thereof for receiving, by at least one interface block of the plurality of interface blocks, respective second instructions based on a second indication included the instructions and performing one or more respective second operations based on receiving the second instructions.

Aspect 5: The method, apparatus, or non-transitory computer-readable medium of any of aspects 1 through 4, where receiving the instructions includes operations, features, circuitry, logic, means, or instructions, or any combination thereof for reading the instructions from non-volatile storage of the memory system using a respective command channel of each interface block of the plurality of interface blocks.

Aspect 6: The method, apparatus, or non-transitory computer-readable medium of aspect 5, where outputting the indication is based on receiving the indication from a second non-volatile storage of the common logic block.

Aspect 7: The method, apparatus, or non-transitory computer-readable medium of any of aspects 5 through 6, where each interface block of the plurality of interface blocks is associated with a respective plurality of data channels between the interface block and the one or more respective memory arrays.

Aspect 8: The method, apparatus, or non-transitory computer-readable medium of any of aspects 5 through 7, where the non-volatile storage includes one or more one-time programmable memory elements.

Aspect 9: The method, apparatus, or non-transitory computer-readable medium of any of aspects 1 through 8, where receiving the initialization command includes operations, features, circuitry, logic, means, or instructions, or any combination thereof for receiving, using an evaluation interface of the common logic block, the initialization command from a host system.

Aspect 10: The method, apparatus, or non-transitory computer-readable medium of any of aspects 1 through 9, further including operations, features, circuitry, logic, means, or instructions, or any combination thereof for determining, by each interface block of the plurality of interface blocks, whether to apply a row repair, a column repair, or a through-silicon via repair for accessing the one or more respective memory arrays based on performing the one or more respective initialization operations.

Figure 8:
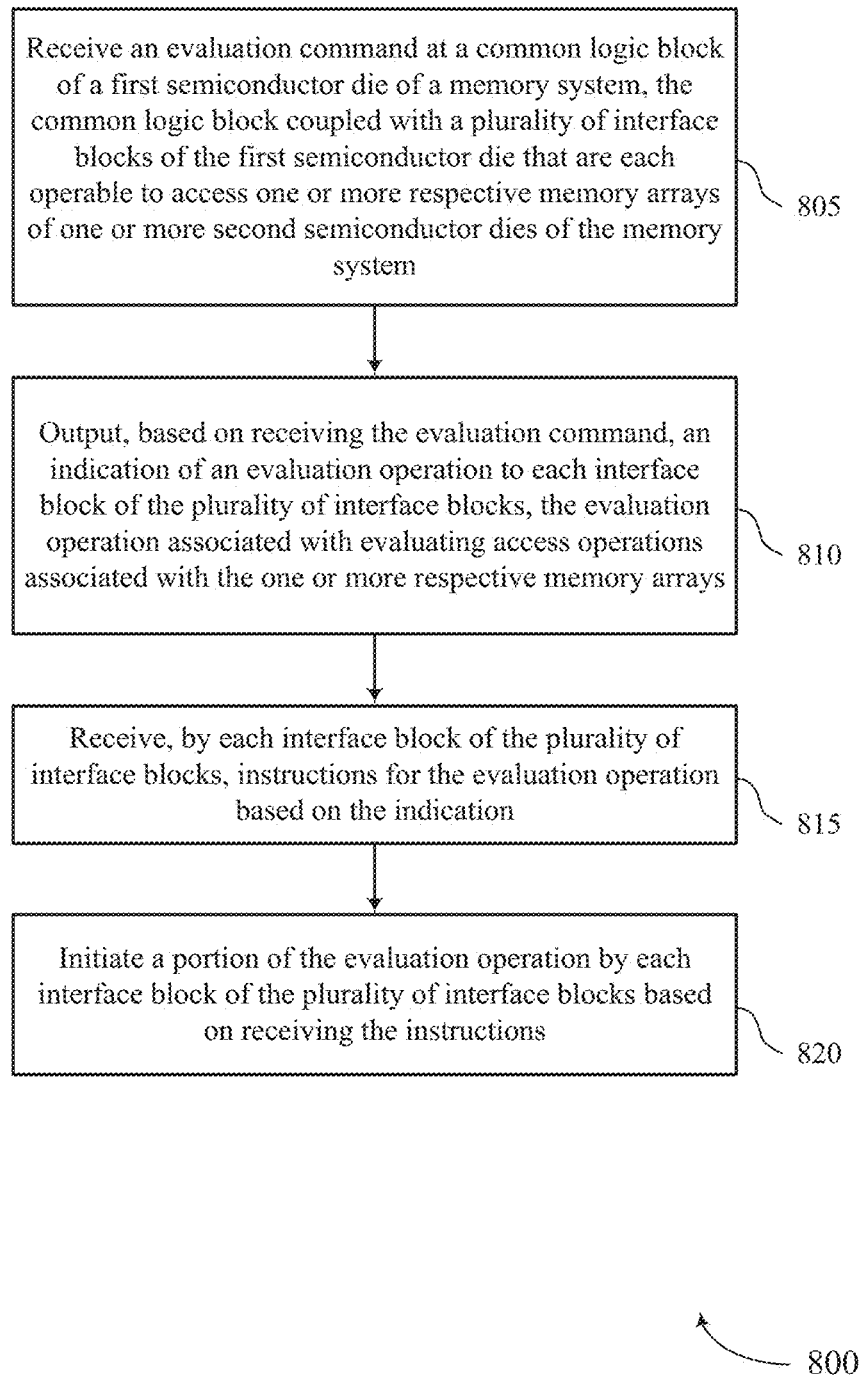

FIG. 8 shows a flowchart illustrating a method 800 that supports boot and initialization techniques for stacked memory architectures in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include receiving an evaluation command at a common logic block of a first semiconductor die of a memory system, the common logic block coupled with a plurality of interface blocks of the first semiconductor die that are each operable to access (e.g., via a respective set of one or more channels) one or more respective memory arrays of one or more second semiconductor dies of the memory system. The operations of 805 may be performed in accordance with examples as disclosed herein. For example, the memory system may include a logic block 230 which receives signaling from a host device (e.g., using an evaluation interface 310).

At 810, the method may include outputting, based on receiving the evaluation command, an indication of an evaluation operation to each interface block of the plurality of interface blocks, the evaluation operation associated with evaluating access operations associated with the one or more respective memory arrays. The operations of 810 may be performed in accordance with examples as disclosed herein. For example, the logic block 230 may include broadcast command circuitry 325 which outputs the indication to an interface block 220.

At 815, the method may include receiving, by each interface block of the plurality of interface blocks, instructions for the evaluation operation based on the indication. The operations of 815 may be performed in accordance with examples as disclosed herein. For example, an interface block 220 may include a command channel controller 360 which receives the instructions from one or more NV arrays 270.

At 820, the method may include initiating a portion of the evaluation operation by each interface block of the plurality of interface blocks based on receiving the instructions. The operations of 820 may be performed in accordance with examples as disclosed herein. For example, an interface block 220 may include an interface controller 305 which executes the instructions.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 11: A method, apparatus, or non-transitory computer-readable medium including operations, features, circuitry, logic, means, or instructions, or any combination thereof for receiving an evaluation command at a common logic block of a first semiconductor die of a memory system, the common logic block coupled with a plurality of interface blocks of the first semiconductor die that are each operable to access (e.g., via a respective set of one or more channels) one or more respective memory arrays of one or more second semiconductor dies of the memory system: outputting, based on receiving the evaluation command, an indication of an evaluation operation to each interface block of the plurality of interface blocks, the evaluation operation associated with evaluating access operations associated with the one or more respective memory arrays: receiving, by each interface block of the plurality of interface blocks, instructions for the evaluation operation based on the indication; and initiating a portion of the instructions for the evaluation operation by each interface block of the plurality of interface blocks based on receiving the instructions.

Aspect 12: The method, apparatus, or non-transitory computer-readable medium of aspect 11, further including operations, features, circuitry, logic, means, or instructions, or any combination thereof for receiving, by an interface block of the plurality of interface blocks, an indication of a second evaluation operation based on performing the instructions for the evaluation operation and initiating, by the interface block, a portion of the second evaluation operation based on receiving the second evaluation operation.

Aspect 13: The method, apparatus, or non-transitory computer-readable medium of any of aspects 11 through 12, further including operations, features, circuitry, logic, means, or instructions, or any combination thereof for storing a value to a register associated with an interface block of the plurality of interface blocks, the value indicating that the interface block has completed the evaluation operation.

Aspect 14: The method, apparatus, or non-transitory computer-readable medium of aspect 13, further including operations, features, circuitry, logic, means, or instructions, or any combination thereof for receiving, at the common logic block and after storing the value, a second evaluation command: outputting, based on receiving the second evaluation command, a second indication of a second evaluation operation to each interface block of the plurality of interface blocks: receiving, by each interface block of the plurality of interface blocks, the second evaluation operation based on outputting the indication; and initiating a portion of the second evaluation operation by each interface block of the plurality of interface blocks based on receiving the second evaluation operation.

Aspect 15: The method, apparatus, or non-transitory computer-readable medium of any of aspects 11 through 14, where the evaluation operation is written to a non-volatile storage of the memory system, and receiving the evaluation operation includes reading the evaluation operation from the non-volatile storage using a respective command channel of each interface block of the plurality of interface blocks.

Aspect 16: The method, apparatus, or non-transitory computer-readable medium of aspect 15, where outputting the indication is based on receiving the indication from a second non-volatile storage of the common logic block.

Aspect 17: The method, apparatus, or non-transitory computer-readable medium of any of aspects 11 through 16, where each interface block of the plurality of interface blocks includes a respective plurality of data channels between the interface block and the one or more respective memory arrays.

Aspect 18: The method, apparatus, or non-transitory computer-readable medium of any of aspects 11 through 17, where the evaluation operation includes a repair operation for one or more columns of memory cells associated with a memory array of the one or more respective memory arrays, a test operation for one or more through-silicon vias (TSVs) of the memory system, an operation associated with disabling one or more memory cells of the one or more respective memory arrays, or a combination thereof.

Figure 9:
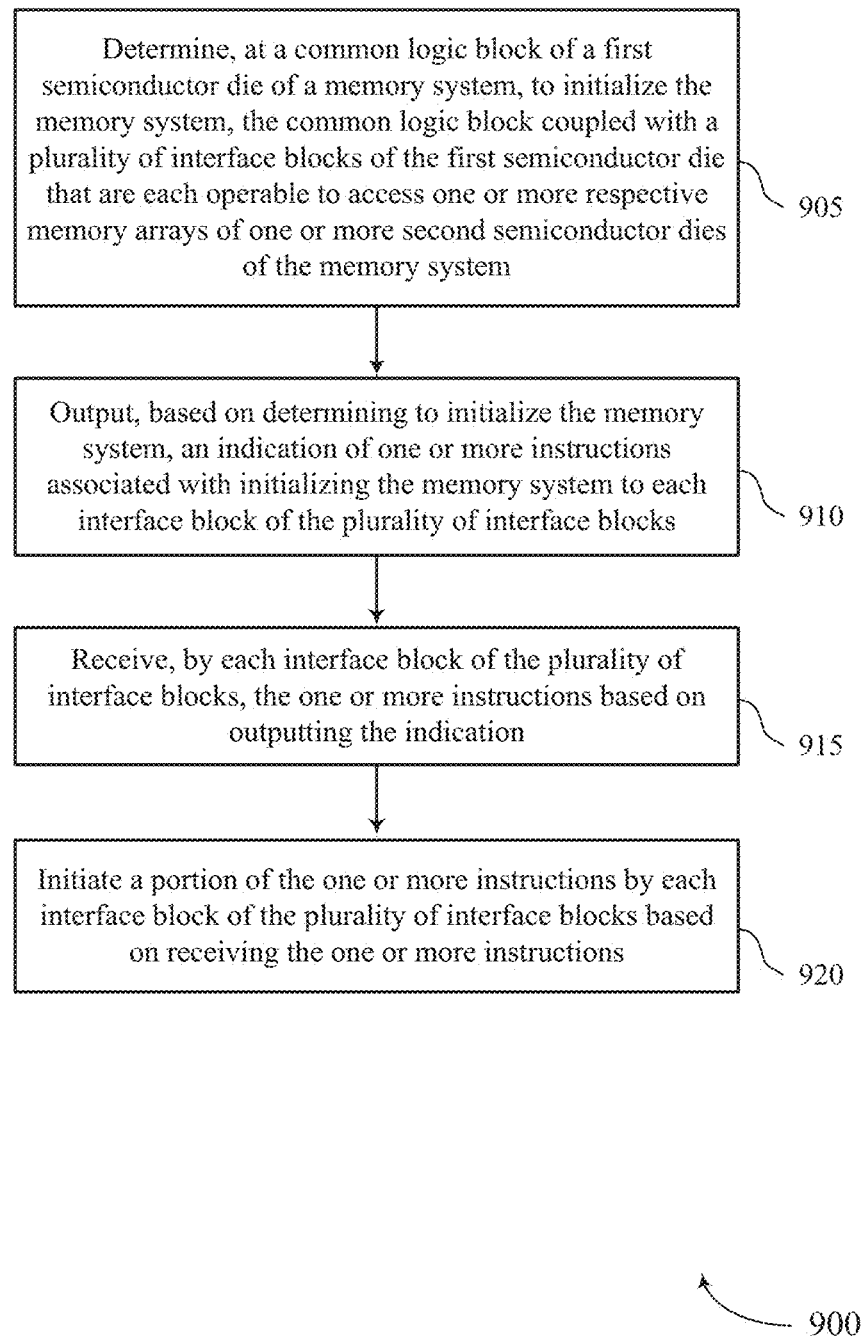

FIG. 9 shows a flowchart illustrating a method 900 that supports boot and initialization techniques for stacked memory architectures in accordance with examples as disclosed herein. The operations of method 900 may be implemented by a memory system or its components as described herein. For example, the operations of method 900 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 905, the method may include determining, at a common logic block of a first semiconductor die of a memory system, to initialize the memory system, the common logic block coupled with a plurality of interface blocks of the first semiconductor die that are each operable to access (e.g., via a respective set of one or more channels) one or more respective memory arrays of one or more second semiconductor dies of the memory system. The operations of 905 may be performed in accordance with examples as disclosed herein. For example, the memory system may include a logic block 230 which determines how to initialize the memory system.

At 910, the method may include outputting, based on determining to initialize the memory system, an indication of one or more instructions associated with initializing the memory system to each interface block of the plurality of interface blocks. The operations of 910 may be performed in accordance with examples as disclosed herein. For example, the logic block 230 may include broadcast command circuitry 325 which outputs the indication to an interface block 220.

At 915, the method may include receiving, by each interface block of the plurality of interface blocks, the one or more instructions based on outputting the indication. The operations of 915 may be performed in accordance with examples as disclosed herein. For example, an interface block 220 may include a command channel controller 360 which receives the instructions from one or more NV arrays 270.

At 920, the method may include initiating a portion of the one or more instructions by each interface block of the plurality of interface blocks based on receiving the one or more instructions. The operations of 920 may be performed in accordance with examples as disclosed herein. For example, an interface block 220 may include an interface controller 305 which executes the instructions.

In some examples, an apparatus as described herein may perform a method or methods, such as the method 900. The apparatus may include features, circuitry, logic, means, or instructions (e.g., a non-transitory computer-readable medium storing instructions executable by a processor), or any combination thereof for performing the following aspects of the present disclosure:

Aspect 19: A method, apparatus, or non-transitory computer-readable medium including operations, features, circuitry, logic, means, or instructions, or any combination thereof for determining, at a common logic block of a first semiconductor die of a memory system, to initialize the memory system, the common logic block coupled with a plurality of interface blocks of the first semiconductor die that are each operable to access (e.g., via a respective set of one or more channels) one or more respective memory arrays of one or more second semiconductor dies of the memory system: outputting, based on determining to initialize the memory system, an indication of one or more instructions associated with initializing the memory system to each interface block of the plurality of interface blocks; receiving, by each interface block of the plurality of interface blocks, the one or more instructions based on outputting the indication; and initiating a portion of the one or more instructions by each interface block of the plurality of interface blocks based on receiving the one or more instructions.

Aspect 20: The method, apparatus, or non-transitory computer-readable medium of aspect 19, where determining to initialize the memory system is based on identifying a power on condition for the memory system.

Aspect 21: The method, apparatus, or non-transitory computer-readable medium of any of aspects 19 through 20, further including operations, features, circuitry, logic, means, or instructions, or any combination thereof for receiving an initialization command at the common logic block and outputting the indication based on receiving the initialization command.

It should be noted that the methods described herein describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 22: An apparatus, including: a first semiconductor die of a memory system, the first semiconductor die including: a common logic block; and a plurality of first interface blocks coupled with the common logic block; and one or more second semiconductor dies of the memory system coupled with the first semiconductor die and including: a plurality of second interface blocks, each second interface block coupled with a respective one of the plurality of first interface blocks; and a plurality of memory arrays, each memory array coupled with one of the plurality of second interface blocks, where the common logic block includes logic circuitry operable to initiate an initialization of the plurality of first interface blocks.

Aspect 23: The apparatus of aspect 22, where the logic circuitry of the common logic block is further operable to: receive an initialization command from a host system; and initiate the initialization based on the received initialization command.

Aspect 24: The apparatus of any of aspects 22 through 23, where the logic circuitry of the common logic block is further operable to: receive an initialization command via an evaluation interface of the common logic block; and initiate the initialization based on the received initialization command.

Aspect 25: The apparatus of any of aspects 22 through 24, where, to initiate the initialization, the logic circuitry of the common logic block is operable to: output, based on initiating the initialization, an indication of instructions to each first interface block of the plurality of first interface blocks.

Aspect 26: The apparatus of aspect 25, where to output the indication, the logic circuitry of the common logic block is operable to read the indication from a non-volatile storage of the common logic block.

Aspect 27: The apparatus of any of aspects 22 through 26, where each first interface block of the plurality of first interface blocks includes respective logic circuitry operable to: receive instructions associated with the initialization.

Aspect 28: The apparatus of aspect 27, where the respective logic circuitry of each first interface block of the plurality of first interface blocks is further operable to: initiate a portion of the instructions based on receiving the instructions.

Aspect 29: The apparatus of any of aspects 27 through 28, where: the one or more second semiconductor dies further include a plurality of one-time programmable memory elements storing information associated with operating the plurality of first interface blocks; and receiving the instructions is based on reading the information from the plurality of one-time programmable memory elements.

Aspect 30: The apparatus of any of aspects 22 through 29, where a second semiconductor die of the one or more second semiconductor dies is coupled with the first semiconductor die based on a fusion of a plurality of second conductive contacts of the second semiconductor die with a plurality of first conductive contacts of the first semiconductor die that electrically couples each second interface block with the respective one of the plurality of first interface blocks.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (e.g., in conductive contact with, connected with, coupled with) one another if there is any electrical path (e.g., conductive path) between the components that can, at any time, support the flow of signals (e.g., charge, current, voltage) between the components. At any given time, a conductive path between components that are in electronic communication with each other (e.g., in conductive contact with, connected with, coupled with) may be an open circuit or a closed circuit based on the operation of the device that includes the connected components. A conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to condition of moving from an open-circuit relationship between components in which signals are not presently capable of being communicated between the components (e.g., over a conductive path) to a closed-circuit relationship between components in which signals are capable of being communicated between components (e.g., over the conductive path). When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions (e.g., code) on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a processor, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or any type of processor. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a computer, or a processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   receiving an initialization command at a common logic block of a first semiconductor die of a memory system, the common logic block coupled with a plurality of interface blocks of the first semiconductor die that are each operable to access, via a respective set of one or more channels, one or more respective memory arrays of one or more second semiconductor dies of the memory system;
   outputting, based on receiving the initialization command, an indication of instructions for each interface block of the plurality of interface blocks;
   receiving, by each interface block of the plurality of interface blocks, the instructions based on the indication; and
   performing, by each interface block of the plurality of interface blocks, one or more respective initialization operations based on each interface block receiving the instructions.

2. The method of claim 1, further comprising:
   storing, by each interface block of the plurality of interface blocks, the received instructions to a respective volatile storage component associated with the interface block, wherein each interface block performing the one or more respective initialization operations is based on each interface block storing the received instructions.

3. The method of claim 1, further comprising:
   storing, based on an interface block of the plurality of interface blocks completing the one or more respective initialization operations, an indication associated with the completion by the interface block to a register.

4. The method of claim 1, further comprising:
   receiving, by at least one interface block of the plurality of interface blocks, respective second instructions based on a second indication included the instructions; and
   performing one or more respective second operations based on receiving the second instructions.

5. The method of claim 1, wherein receiving the instructions comprises:
   reading the instructions from non-volatile storage of the memory system using a respective command channel of each interface block of the plurality of interface blocks.

6. The method of claim 5, wherein outputting the indication is based on receiving the indication from a second non-volatile storage of the common logic block.

7. The method of claim 5, wherein each interface block of the plurality of interface blocks is associated with a respective plurality of data channels between the interface block and the one or more respective memory arrays.

8. The method of claim 5, wherein the non-volatile storage comprises one or more one-time programmable memory elements.

9. The method of claim 1, wherein receiving the initialization command comprises:
   receiving, using an evaluation interface of the common logic block, the initialization command from a host system.

10. The method of claim 1, further comprising:
    determining, by each interface block of the plurality of interface blocks, whether to apply a row repair, a column repair, or a through-silicon via repair for accessing the one or more respective memory arrays based on performing the one or more respective initialization operations.

11. An apparatus, comprising:
    a first semiconductor die of a memory system, the first semiconductor die comprising:
    a common logic block; and
    a plurality of first interface blocks coupled with the common logic block; and
    one or more second semiconductor dies of the memory system coupled with the first semiconductor die and comprising:

a plurality of second interface blocks, each second interface block coupled with a respective one of the plurality of first interface blocks via a respective set of one or more channels; and a plurality of memory arrays, each memory array coupled with one of the plurality of second interface blocks, wherein the common logic block comprises logic circuitry operable to initiate an initialization of the plurality of first interface blocks.

12. The apparatus of claim 11, wherein the logic circuitry of the common logic block is further operable to:

receive an initialization command from a host system; and initiate the initialization based on the received initialization command.

13. The apparatus of claim 11, wherein the logic circuitry of the common logic block is further operable to:

receive an initialization command via an evaluation interface of the common logic block; and initiate the initialization based on the received initialization command.

14. The apparatus of claim 11, wherein, to initiate the initialization, the logic circuitry of the common logic block is operable to:

output, based on initiating the initialization, an indication of instructions to each first interface block of the plurality of first interface blocks.

15. The apparatus of claim 14, wherein to output the indication, the logic circuitry of the common logic block is operable to read the indication from a non-volatile storage of the common logic block.

16. The apparatus of claim 11, wherein each first interface block of the plurality of first interface blocks comprises respective logic circuitry operable to:

receive instructions associated with the initialization.

17. The apparatus of claim 16, wherein the respective logic circuitry of each first interface block of the plurality of first interface blocks is further operable to:

perform one or more initialization operations based on receiving the instructions.

18. The apparatus of claim 16, wherein:

the one or more second semiconductor dies further comprise a plurality of one-time programmable memory elements storing information associated with operating the plurality of first interface blocks; and receiving the instructions is based on reading the information from the plurality of one-time programmable memory elements.

19. The apparatus of claim 11, wherein a second semiconductor die of the one or more second semiconductor dies is coupled with the first semiconductor die based on a fusion of a plurality of second conductive contacts of the second semiconductor die with a plurality of first conductive contacts of the first semiconductor die that electrically couples each second interface block with the respective one of the plurality of first interface blocks.

20. A method, comprising:

receiving an evaluation command at a common logic block of a first semiconductor die of a memory system, the common logic block coupled with a plurality of interface blocks of the first semiconductor die that are each operable to access, via a respective set of one or more channels, one or more respective memory arrays of one or more second semiconductor dies of the memory system;

outputting, based on receiving the evaluation command, an indication of an evaluation operation to each interface block of the plurality of interface blocks, the evaluation operation associated with evaluating access operations associated with the one or more respective memory arrays;

receiving, by each interface block of the plurality of interface blocks, instructions for the evaluation operation based on the indication; and initiating a portion of the evaluation operation by each interface block of the plurality of interface blocks based on receiving the instructions.

* * * * *